United States Patent [19]
Kazarian

[11] Patent Number: 6,007,107
[45] Date of Patent: Dec. 28, 1999

[54] FLUID COUPLING FOR MATCHING DELIVERY AND SUPPLY LINES IRRESPECTIVE OF THE RELATIVE ROTATIONAL POSITIONS OF THE COUPLING MEMBERS

[75] Inventor: Randal N. Kazarian, Santa Barbara, Calif.

[73] Assignee: Container Technology, Inc., Santa Barbara, Calif.

[21] Appl. No.: 08/683,516

[22] Filed: Jul. 12, 1996

[51] Int. Cl.[6] ................................................. F16L 35/00
[52] U.S. Cl. ...................... 285/120.1; 285/328; 285/330; 285/331; 285/913; 285/914
[58] Field of Search .................................. 285/328, 330, 285/914, 913, 921, 120.1, 331

[56] References Cited

U.S. PATENT DOCUMENTS

| | | | |
|---|---|---|---|
| 655,672 | 8/1900 | Engel . | |
| 665,252 | 1/1901 | Morawetz . | |
| 729,145 | 5/1903 | Eckenwiler . | |
| 850,070 | 4/1907 | Spikes . | |
| 928,813 | 7/1909 | Spikes . | |
| 1,304,390 | 5/1919 | Semenow et al. . | |
| 2,187,389 | 1/1940 | Winkler | 255/40 |
| 2,790,571 | 4/1957 | Flaith et al. . | |
| 3,005,475 | 10/1961 | Beall | 141/198 |
| 3,035,603 | 5/1962 | Jamieson et al. | 137/323 |
| 3,065,885 | 11/1962 | Chatten | 222/400.7 |
| 3,301,578 | 1/1967 | Platt et al. | 285/331 |
| 3,361,152 | 1/1968 | Akers | 137/212 |
| 3,670,929 | 6/1972 | Berry | 222/400.7 |
| 3,861,569 | 1/1975 | Johnston | 222/400.7 |
| 4,080,737 | 3/1978 | Fleer | 285/914 |
| 4,089,444 | 5/1978 | Shea | 222/400.7 |
| 4,134,522 | 1/1979 | Patzke et al. | 222/153 |
| 4,150,673 | 4/1979 | Watt | 285/914 |
| 4,211,439 | 7/1980 | Moldestad | 285/914 |

(List continued on next page.)

FOREIGN PATENT DOCUMENTS

| | | | |
|---|---|---|---|
| 670440 | 9/1963 | Canada | 285/914 |
| 77828 | 8/1949 | Czechoslovakia | 285/331 |
| 372373 | 6/1990 | European Pat. Off. | 285/914 |
| 2625545 | 7/1989 | France | 285/914 |
| 1218237 | 6/1966 | Germany | 285/331 |
| 64829 | 5/1942 | Norway | 285/331 |
| 67082 | 11/1943 | Norway | 285/331 |
| 771968 | 4/1957 | United Kingdom | 285/914 |

*Primary Examiner*—Eric K. Nicholson
*Attorney, Agent, or Firm*—Leo F. Costello

[57] ABSTRACT

A quick-connect coupling for interconnecting only matching fluid delivery and supply lines while preventing the inadvertent connection of mismatched lines where there are matched and mismatched delivery and supply lines. The coupling includes first and second coupling members that are releasably slidably, axially interfitted with their passageways in fluid communication. In the disclosed embodiment of a coupling for use in a chemical extraction system, one coupling member is a male member connected to the supply lines in the typical fifty gallon drum and the other coupling member is a female coupling member connected to the delivery lines. Key coding elements on the coupling members are movable into matched interengagement when the supply and delivery lines are matched but are precluded from moving into matched interengagement when the lines are mismatched. If a match exists, the coding elements interfit without relative rotation of the coupling members and irrespective of the relative rotational positions of the coupling members prior to such interengagement. Latches in the coupling are allowed by the key coding to move into latching positions when the key coding elements match, but are precluded by the key coding from moving into latching positions when there is a mismatch. The coupling members are coupled by axially thrusting the members together whereupon the latches move out to allow interfitting and then return to latching positions. The coupling members are uncoupled by simultaneously pressing inwardly on the latches on the outside of the coupling and pulling the coupling members apart.

21 Claims, 13 Drawing Sheets

U.S. PATENT DOCUMENTS

| | | | |
|---|---|---|---|
| 4,411,287 | 10/1983 | Hyde | 137/315 |
| 4,436,125 | 3/1984 | Blenkush | 141/330 |
| 4,529,105 | 7/1985 | Lewins | 222/153 |
| 4,619,640 | 10/1986 | Potolsky | 285/914 |
| 4,665,960 | 5/1987 | Brzezicki | 285/914 |
| 4,699,298 | 10/1987 | Grant et al. | 222/400.7 |
| 4,790,567 | 12/1988 | Kwano et al. | 285/914 |
| 4,804,208 | 2/1989 | Dye | 285/914 |
| 4,907,019 | 3/1990 | Stephens | 285/914 |
| 5,052,725 | 10/1991 | Meyer et al. | 285/308 |
| 5,108,015 | 4/1992 | Rauworth et al. | 222/400.7 |

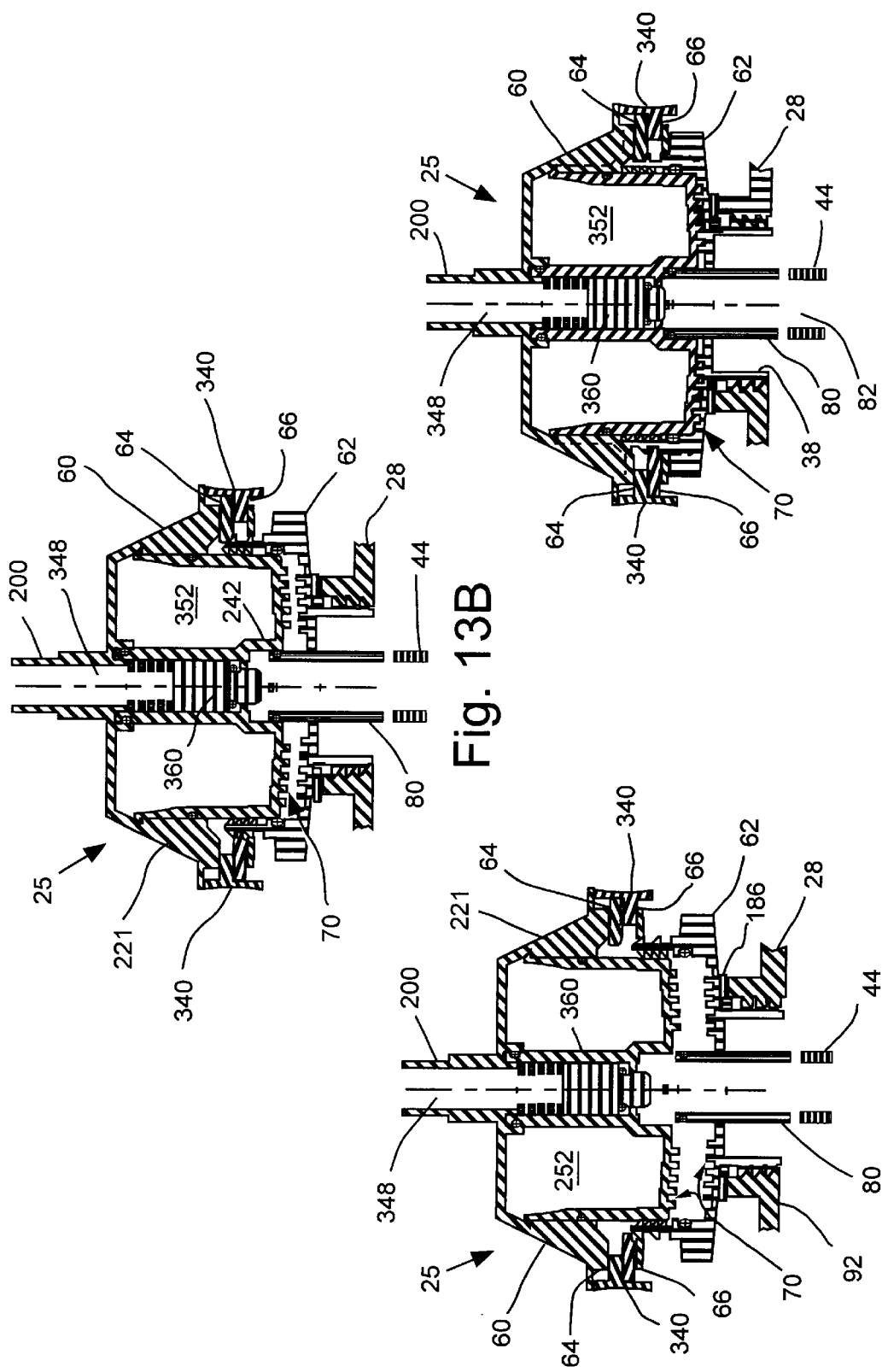

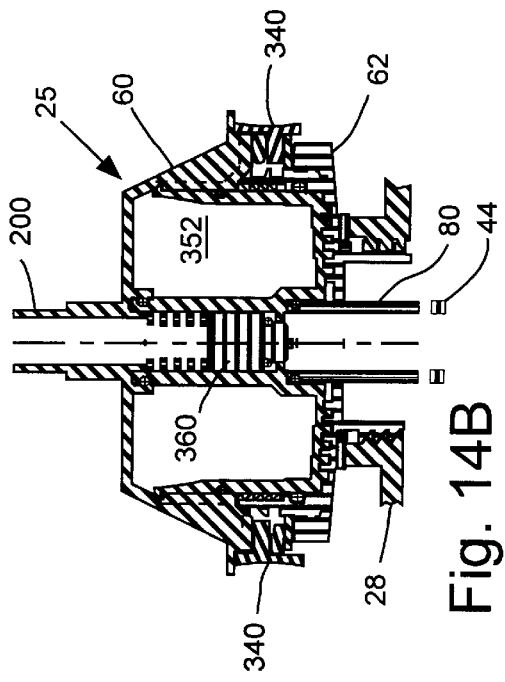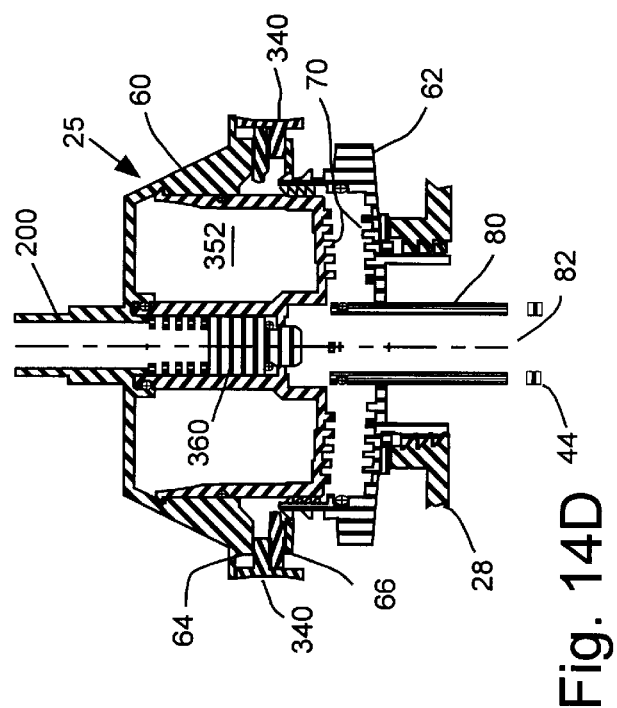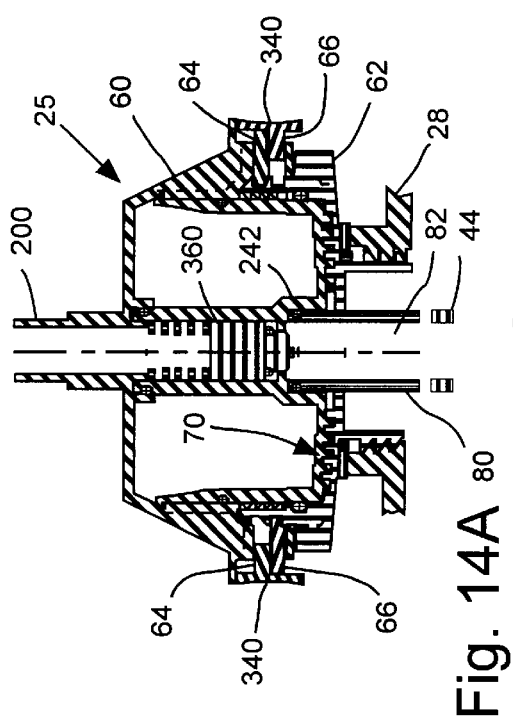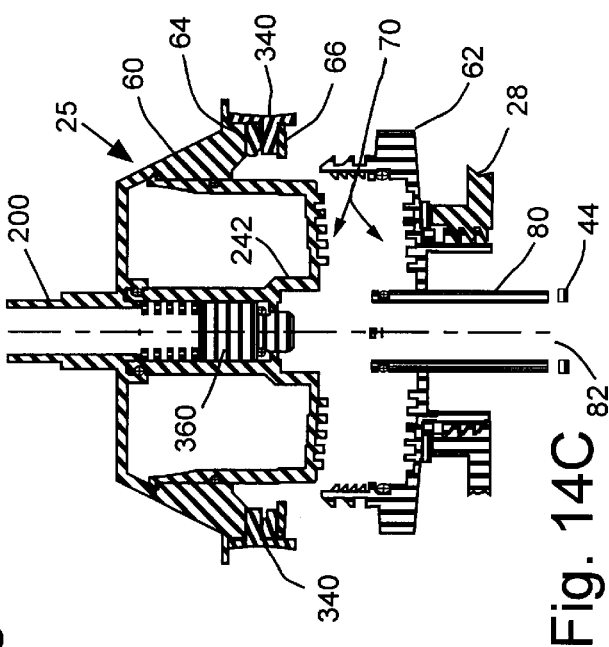

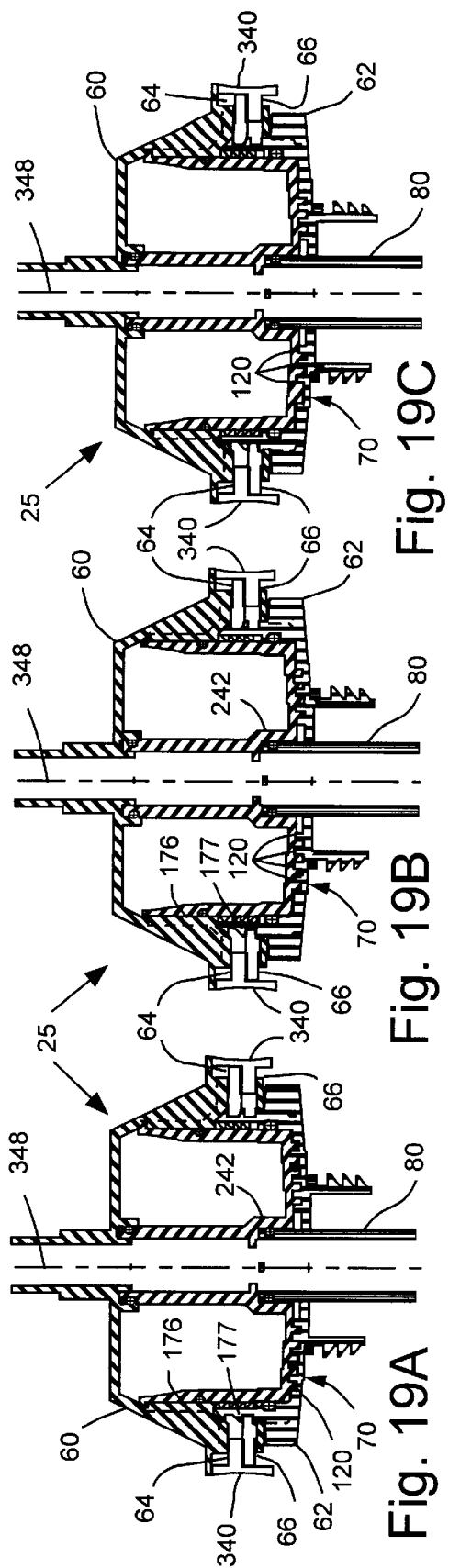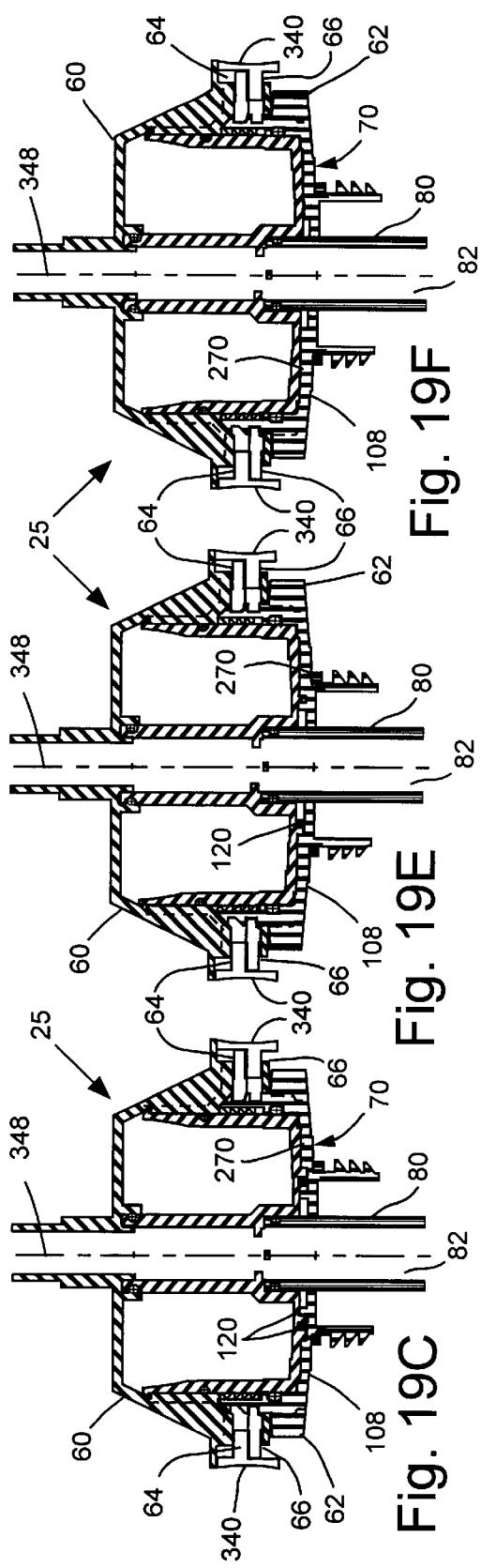

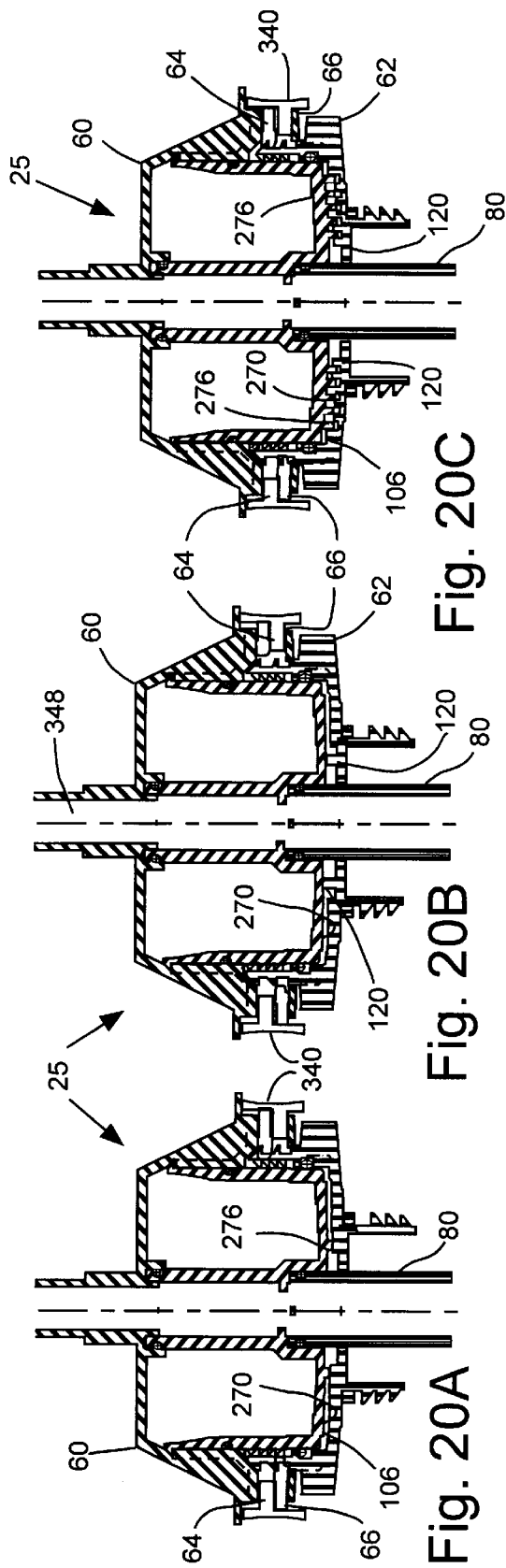
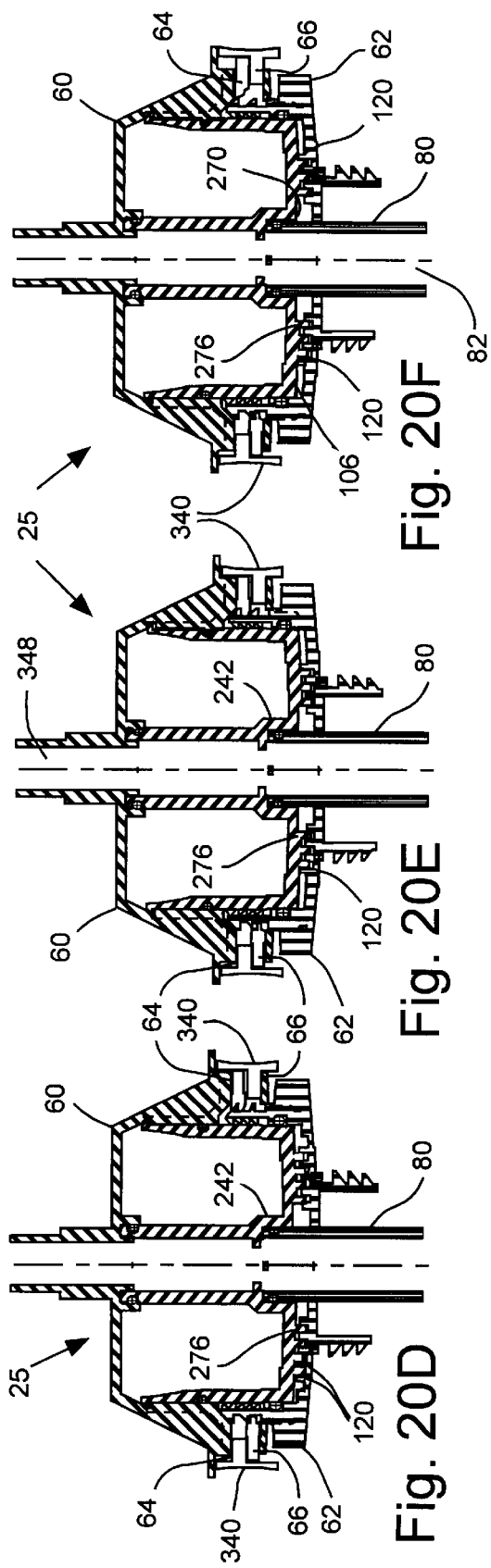

FLUID COUPLING FOR MATCHING DELIVERY AND SUPPLY LINES IRRESPECTIVE OF THE RELATIVE ROTATIONAL POSITIONS OF THE COUPLING MEMBERS

FIELD OF THE INVENTION

The present invention pertains to a fluid coupling and system for use thereof and more particularly to a quick-connect and -disconnect fluid coupling having coupling members that are quickly connectable and disconnectable and to a system which incorporates in the coupling different matching key-coded elements that ensure not only quick connection but connection of only those coupling members that match.

BACKGROUND

In various industries, it is necessary to use many chemicals in the manufacturing process. For example, in the semiconductor industry, some fifteen to twenty liquid chemicals are typically stored in adjacent fifty-gallon drums from which they are dispensed during the manufacture of the semiconductors. In the usual installation, sets of umbilical delivery lines for various chemicals are suspended above the drums with a particular set dedicated to a particular chemical. Each set of delivery lines is connected to its associated drum by a coupling which has one coupling member on the delivery lines and a second coupling on the drum.

As each drum is emptied during the manufacturing process, a full drum is brought in to replace the empty one. Accordingly, the coupling members must be repeatedly connected and disconnected. Because of the incompatibility of the chemicals, it is critical that each set of delivery lines be connected only to its intended drum to avoid unsafe mixing and undesired contamination. Moreover, to maintain productivity, such connections and disconnections must be made quickly and routinely by production personnel.

To insure correct connection of delivery lines to their intended drums, the known chemical extraction apparatus uses fluid couplings that incorporate matching coding elements on the coupling members. Examples of such fluid couplings and their coding devices are shown and described in the U.S. Pat. No. 4,699,298 to Grant et al. and U.S. Pat. No. 5,108,015 Rauworth et al. A significant disadvantage of these known couplings, however, is that they cannot be as quickly connected and disconnected as is desired. Although referred to as quick-connect couplings, they use threads to establish the connection. Repeated threading and unthreading of couplings over a production run consumes a significant amount of valuable time and also can produce additional delays if the threads become fouled and otherwise fail to mesh properly. Moreover, the coding devices of these known couplings require relative rotation of the coded parts to test for a match and then to make the match or to realize that the coupling members are mismatched.

Fluid couplings that can be connected and disconnected without threading are of course available and are truly quick-connect and -disconnect couplings. Examples of known quick-connect couplings are disclosed in U.S. Pat. No. 4,436,125 to Blenkush and U.S. Pat. No. 5,052,725 to Meyer et al. Such known couplings of this type, however, are not suitable for the chemical extraction industry or other industries where matched connections are mandatory since they make no provision for coding. Moreover, the latching mechanisms used in such known quick-connect couplings do not lend themselves to balanced and dependable two-handed operation by personnel in production processes such as described above.

SUMMARY

A quick-connect coupling is provided for enabling interconnection of only matching coupling members while preventing the inadvertent interconnection of mismatched coupling members notwithstanding the presence of a plurality of coupling members some of which are matched and some of which are mismatched. The coupling includes first and second coupling members that are releasably slidably, axially interfitted with their passageways in fluid communication. Key coding elements on the coupling members are movable into matched interengagement when the coupling members are matched but are precluded from moving into matched interengagement when they are mismatched. If a match exists, the coding elements interfit without relative rotation of the coupling members and irrespective of the relative rotational positions of the coupling members prior to such interengagement. Latches in the coupling are allowed by the key coding to move into latching positions when the key coding elements match but are precluded by the key coding from moving into latching positions when there is a mismatch. The subject key coding system is especially advantageous in providing a user with immediate visual indications of whether particular coupling members are matched or mismatched. The coupling members are coupled by simply axially thrusting the members together whereupon the latches move out to allow interfitting and then return to latching positions. The coupling members are uncoupled by simultaneously pressing inwardly on the latches on the outside of the coupling and pulling the coupling members apart.

An object of this invention is to provide an improved quick-connect coupling.

Another object is to provide a quick-connect and disconnect coupling for use in a chemical extraction system involving drums of chemicals and delivery lines suspended above the drums.

A further object is to improve the productivity and safety of dispensing a plurality of incompatible chemicals through different delivery lines from different drums in a manufacturing process.

A still further object is to provide an improved coding system for enabling desired interconnection of only matched coupling members of a fluid coupling.

Yet another object is to incorporate a coding system for a quick-connect coupling that prevents coupling of mismatched coupling members while still allowing quick connection and disconnection of the coupling.

An additional object is to code fluid coupling members so that, apart from a visual inspection, testing for a match and establishing a coupling is accomplished without relative rotation and solely by axial movement of the coupling members and without regard to the relative rotational positions of the coupling members prior to or during interfitting thereof.

A still further object is to provide a key-coded, quick-connect coupling that does not require swiveling of its coupling members for connection but permits the parts being coupled to swivel without affecting the rapidity of interconnecting matched coupling members and without affecting operation of coupling.

A further object is to minimize the time required dependably to connect matched coupling members of a coded coupling or to determine that the coupling members are mismatched and will not couple.

Another object is to provide a coded quick-connect coupling composed of parts that are molded or machined of plastic materials and that has molded-in identification of the codes.

An additional object is to provide a key coding system for a coupling that enables many different combinations of matches and mismatches.

Yet another object is to provide a molded one-piece latch for a fluid coupling.

A further object is to provide a dual latch assembly including pair of duplicate molded latches for a coupling that can be made using the same mold.

Another object is to provide a symmetrical latching mechanism for a quick-connect coupling.

An additional object is to provide a quick-connect coupling which has dual latching members on one of the coupling members that engage latching elements on both sides of the other coupling member in the coupled or latched condition.

A still further object is to provide a latching mechanism for a quick-connect coupling in which the external appearance of the latches indicates the coupled or uncoupled status of the coupling.

Still another object is to provide integral molded latches for a fluid coupling in which resiliently flexible biasing arms for the latches are not exposed externally of the coupling.

Another object is to isolate the latches of a quick-connect coupling from the fluids carried by the coupling.

A further object is provide a quick-connect fluid coupling in which latches are captured in the coupling by the assembly thereof.

Yet an additional object is to provide a quick-connect coupling which automatically snaps into coupled position upon axially thrusting the coupling members together but which requires simultaneous, two-handed pressure on opposite sides of the coupling to release the coupling members.

A further object is to provide a coded, quick-connect coupling with improved sealing capabilities.

Yet another object is to provide an interactive key coding system and latching mechanism in a quick-connect coup ling wherein the coupling members cannot be coupled unless they match.

Still further, an object is to minimize the twisting and tangling of the umbilical lines that hang above a plurality of drums of chemicals used in a chemical manufacturing process and that are connected and disconnected to and from selected drums.

A further object is to minimize the manufacturing costs of a quick-connect coupling.

Another object is to provide a fluid coupling where in first and second coupling members respectively connected to a source of fluid and to delivery lines are repeatedly uncoupled and recoupled and wherein fluid is allowed to drain back into the source and out of the coupling during such uncoupling and recoupling.

Still another object is to provide a fluid coupling for use on a typical fifty-five gallon drum containing liquid for the chemical processing industry which has an extractor drum insert and bung that are compatible with the bung hole, rim, and other characteristics of such a drum, and which can withstand the drop tests required of such drums and their standard bungs.

A further object is to facilitate the assembly of the parts of one of the coupling members that is incorporated in the extractor head of a chemical extraction coupling.

These and other objects, features and advantages of the present invention will become apparent upon reference to the following description, accompanying drawings, and appended claims.

DESCRIPTION OF THE DRAWINGS

FIGS. 13A, 13B, and 13C are vertical cross sectional views on a one-half reduced scale from FIGS. 1 through 9, taken on line B—B in FIG. 3, and showing the coupling in three significant stages of the axial coupling movement.

FIGS. 14A through 14D are vertical cross sectional views on a one-half reduced scale from FIGS. 1 through 9, taken on line B—B in FIG. 3, and showing the coupling in different stages of uncoupling movement.

FIGS. 19A through 19F are vertical cross sectional views on a one-half reduced scale taken on line B—B in FIG. 3 and showing different pairs of interfitted matched coupling members in accordance with the key coding system of the present invention.

FIGS. 20A through 20F are vertical cross sectional views on a reduced scale taken on line B—B in FIG. 3 and showing different pairs of mismatched coupling members unable to be interfitted in accordance with the key coding system of the present invention.

DETAILED DESCRIPTION

Figure 1:
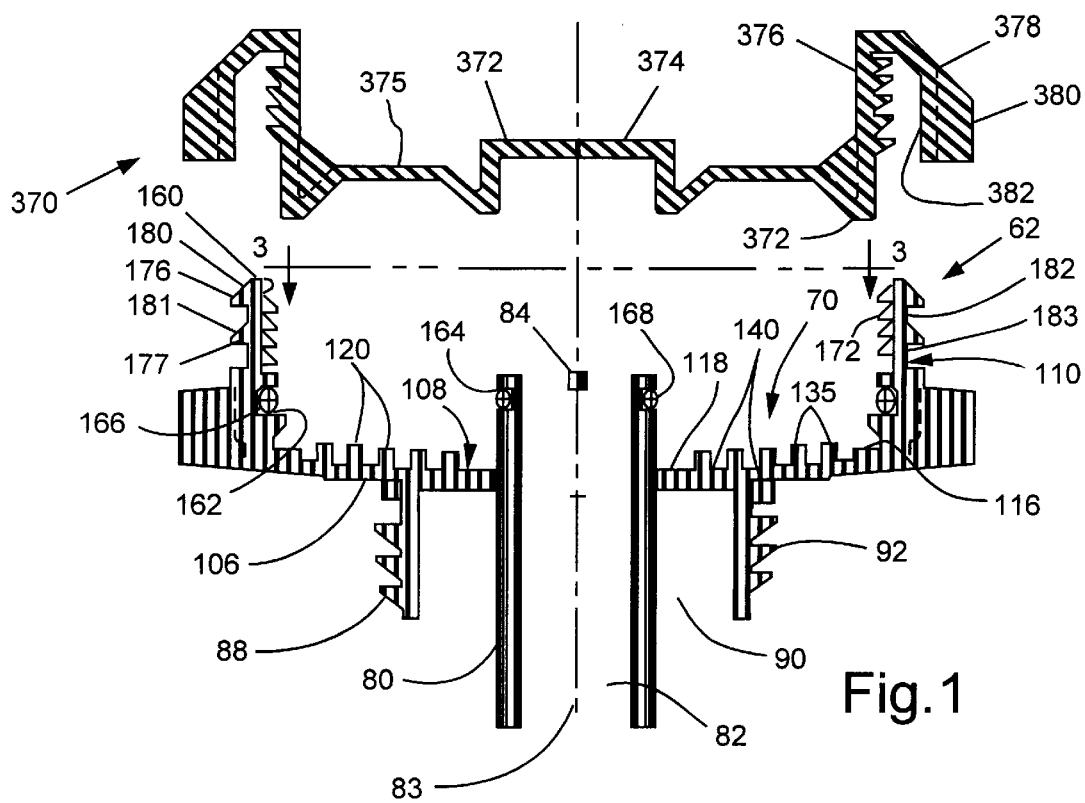
FIG. 1 is an enlarged, exploded vertical section of the extractor drum insert of the quick-connect coupling of the present invention and of the bung which is connectable to the insert but which is shown disconnected from the insert.

With particular reference to FIGS. 1–6, a quick-connect fluid coupling in accordance with the present invention is generally indicated by the numeral 25. The coupling is both a "quick-connect" and a "quick-disconnect" coupling, but as is well known, such expressions as "quick-connected," "quick-disconnect," and "quick-release" coupling are commonly used to mean a coupling that has both quick-connecting and quick-disconnecting capabilities. According, the expression "quick-connect" coupling is used herein to mean a coupling that is both quick to connect and quick to disconnect without repeating the word "disconnect" every time.

The subject coupling 25 (FIGS. 5 and 6) is particularly adapted for use in conducting chemicals in the semiconductor industry where a variety of highly corrosive and incompatible chemicals are used. Such chemicals include ammonium hydroxide; hydrogen peroxide; and hydrofluoric phosphoric, nitric, hydrochloride and sulfuric acids. These chemicals are typically stored in a plurality of fifty-five-gallon drums, partially indicated at 28 (FIG. 2) and as more fully illustrated in U.S. Pat. No. 5,108,015 which are part of a chemical extraction apparatus, which uses a coupling that is replaced by the subject coupling. Each drum has a top cover 34 which may be upwardly convex, an encircling rim, not shown, projecting upwardly around the cover, and an internally threaded bung hole 38.

The chemical extraction apparatus (FIG. 2) also includes chemical-supply or down tube or line 44 immersed in the chemicals of their respective drums and extended up to the bung hole 38 thereof. Also, the apparatus includes chemical and air delivery hoses or lines, not shown, attached to a fluid coupling and extending to the work areas of the semiconductor plant where the chemicals are to be used. As is well known, the delivery hoses associated with each chemical are suspended in an umbilical fashion above the drums 28 and are connected to their respective drums by a fluid coupling, in the present case, the fluid coupling 25. The subject coupling allows for the quick and dependable disconnection and re-connection of the delivery hoses to the down tube when a depleted drum is removed and a full drum replaces it, while ensuring that the delivery hoses for a particular chemical are connected to the particular drum containing that chemical.

The quick-connect fluid coupling 25 (FIGS. 1 through 9, especially FIG. 7) of the present invention in general includes an extractor head 60, abbreviated herein as "EH," connected to the delivery hoses, not shown; an extractor drum insert 62, abbreviated herein as "EDI," connected to the drum 28 and its down tube 44; upper and lower latches 64 and 66 in the EH which releasably interconnect the EH and the EDI if they match; a poppet valve 68 which opens and closes upon connection and disconnection of the coupling; and a key coding system generally indicated by the numeral 70 which ensures connection of the EH on the delivery hoses for a certain chemical to the EDI in the drum containing that chemical.

The extractor-drum insert or bung insert (EDI) 62 is best shown in detailed cross-section in FIG. 1. In describing the orientation of the EDI as well as the other parts of the subject coupling 25, a vertical orientation of the coupling is assumed since this is its normal position in use. It will be understood, of course, that the invention is not limited to use in a vertical position, but such reference is convenient for descriptive purposes. The EDI is made from a corrosion-resistant material, preferably a fluoropolymer plastic such as "Teflon" PFA, that is, perfluoroalkoxy, sold by the DuPont Corporation among others. In fact, all parts of the fluid coupling, except for the latches 64 and 66, are made of such a corrosion-resistant plastic. Most of the parts of the coupling may be either molded or machined as will be understood by those skilled in the art.

The EDI 62 (FIGS. 1 and 2) includes an inner tubular male coupling member 80, a tubular drum fitting 88, a radial base wall 106, and an annular outer wall 110. The male coupling member has a central fluid passageway 82 which defines a longitudinal axis 83 of the coupling 25 and has upper and lower ends respectively above and below the radial base wall. The upper end of the male coupling member is adapted to couple to the EH 60 in a manner to be described, and the lower end is welded to the down tube 44. A spider 84 of well known construction and operation is attached to the upper end of the male coupling member. The outer wall extends above the upper end of the male coupling member. The drum fitting has external threads 92 which thread into the bung hole 38 of the drum 28 (FIG. 2) thereby to connect the EDI to the drum. The drum fitting is in spaced, concentric, circumscribing relation to the male coupling member and defines an outer fluid passageway 90 therewith. The base wall has a plurality of vents 107 (FIGS. 3, 4, 6) that, in the chemical extraction use of the coupling 25, supply air to the drum 28 and, as will be seen, drain liquid back into the drum. The base wall also has a floor surface 108 of inverted frusto-conical shape so that it is downwardly convergent from its outer circumference toward the vents 107 and of stepped or terraced contour for a purpose to be described.

The key-coding system 70 of the fluid coupling 25 (FIGS. 4, 6, 7, and 20B), insofar as the extractor drum insert 62 is concerned, is provided on the floor surface 108 of the base wall 106. Thus, the floor surface 108 includes a continuous circular outer seating surface 116 immediately adjacent to the outer wall 110 which constitutes an upper tier of the key coding system in the EDI. The floor surface also has a continuous circular inner seating surface 118 immediately circumscribing the male coupling member 80 and constituting a lower tier of the coding system. In between, the key-coding system includes a plurality of intermediate, radially spaced, circumferentially segmented, concentric coding rings 120 circumscribing the male coupling member between the inner and outer seating surfaces and having equal heights or axial dimension but radial upper surfaces or ledges gradually stepped down from the outer to the inner seating surface. In the illustrated embodiment the rings are not continuous, but are segmented as shown in FIGS. 3, 4, 17, and 18 and as further described below.

As will be described in greater detail as the description proceeds, the characteristics of these coding rings 120 determine the code of any particular coupling 25. One of these characteristics is the number of coding rings employed in any given coupling. For example, five coding rings are shown except in FIGS. 19B through F and 20A through C, E, and F, where for example, four rings are shown in FIG. 19B, three in 19C, two in FIG. 19D, one in FIG. 19E, and none in FIG. 19F. More will be said subsequently about the manner in which the coding is accomplished with the subject key-coding system.

Figure 2:
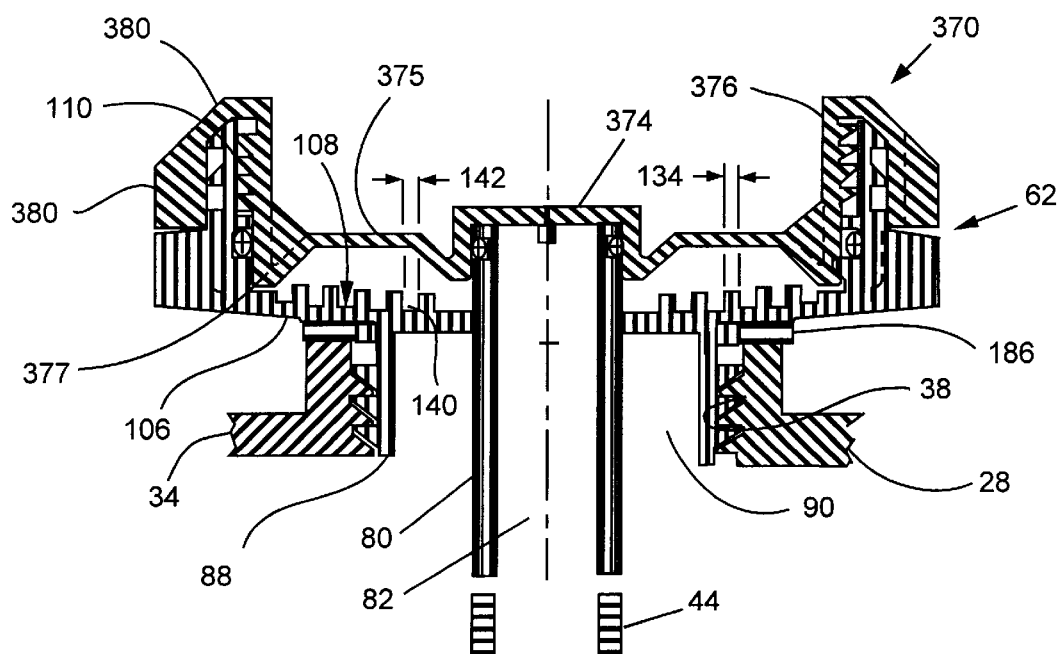
FIG. 2 is a vertical section similar to FIG. 1 but showing the extractor drum insert and threaded into the bung of a drum as used in a chemical extraction apparatus including a down tube fragmentarily shown in the drum.
Figure 3:
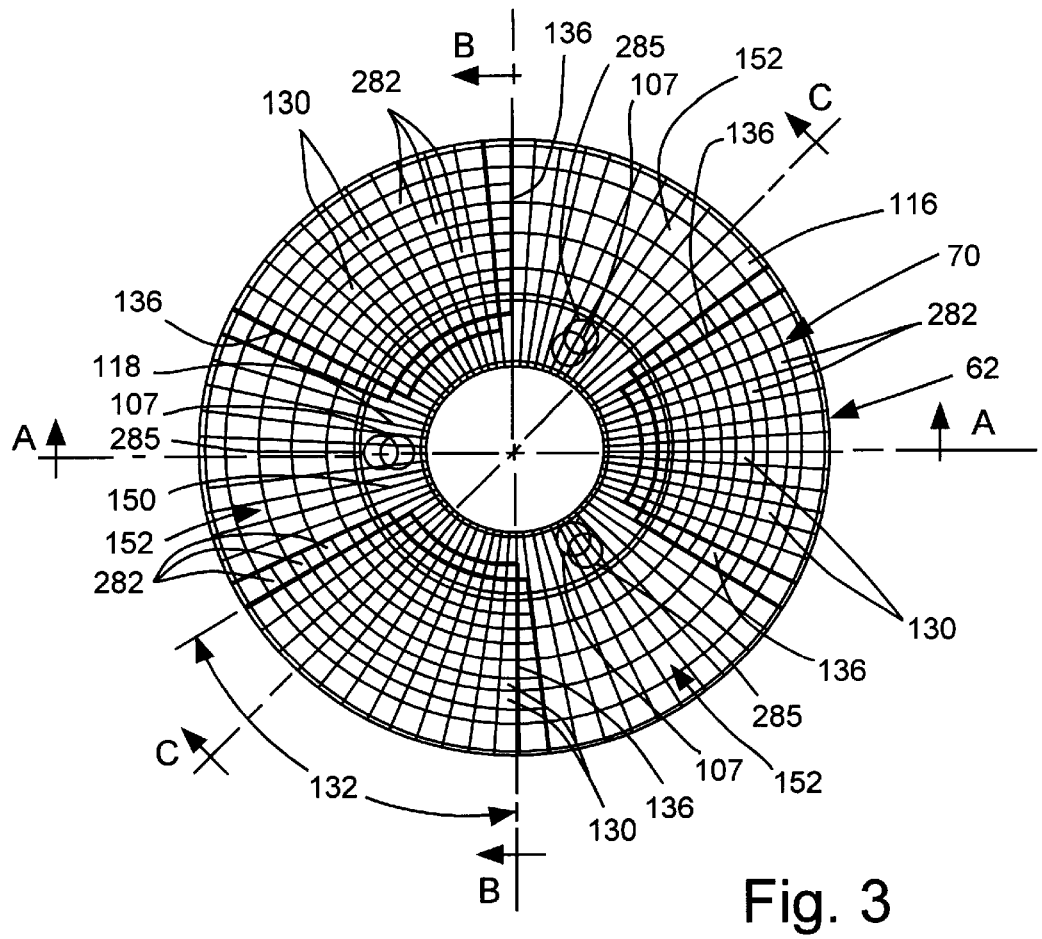
FIG. 3 is a plan or end view of the key coding elements inside the extractor drum insert as seen from a position indicated by line 3—3 of FIG. 1 but with a schematic of the key coding elements of the extractor head shown overlaid on the insert.
Figure 4:
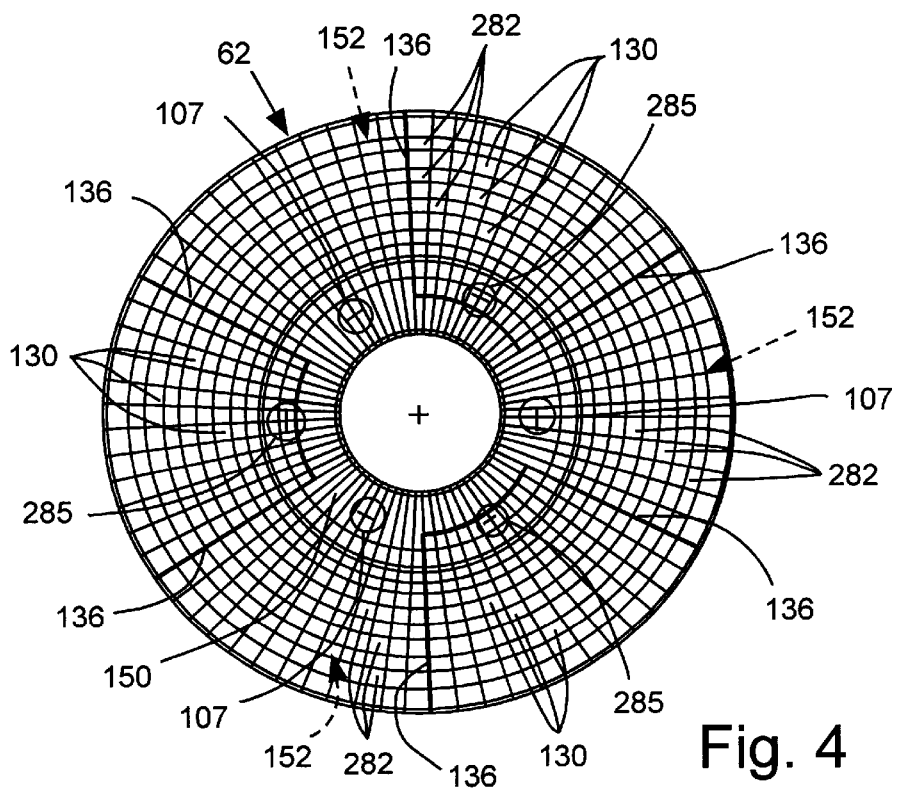
FIG. 4 is a view similar to FIG. 3 but with the extractor drum insert rotated by sixty degrees from its position in FIG. 3 as indicated by the locations of said overlaid elements and to show that the key rings overlap in all relative rotational positions.
Figure 18:
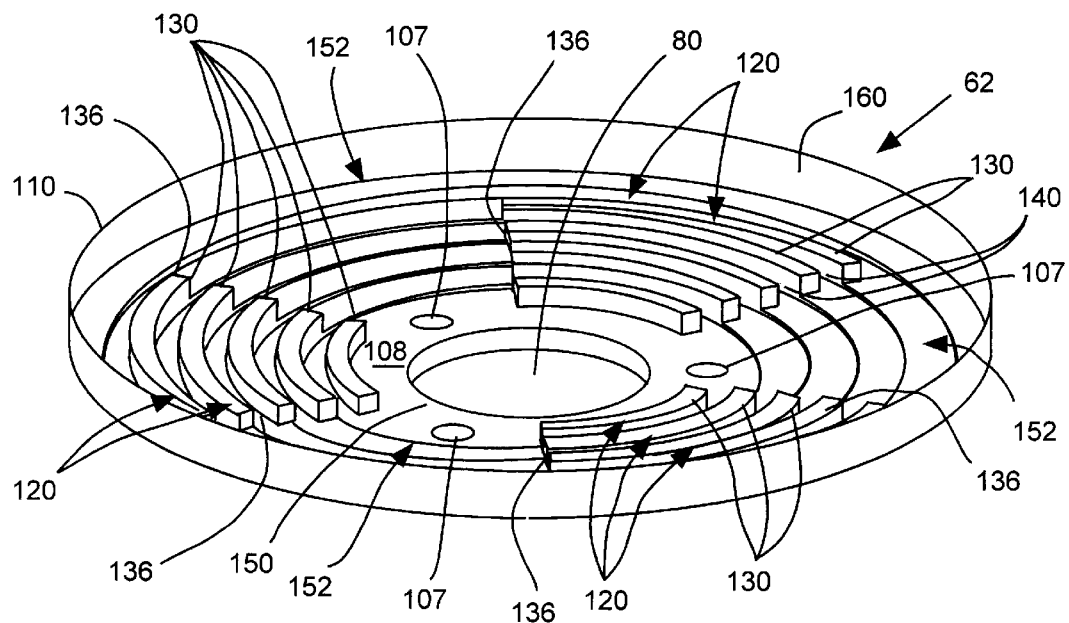

Each coding ring 120 (FIGS. 1, 2, 3, and 18) on the EDI 62 includes a plurality of circumferentially spaced, arcuate ring segments or keys 130. Three keys per ring (FIGS. 3 and 18) are shown in the disclosed embodiment although the inventive concept is not limited to three. Each key has a length 132 measured along its arc, a width 134 (FIG. 2) measured radially of the key, an upper body 135 (FIG. 1) and opposite ends 136 (FIGS. 3 and 18). The keys are radially separated by continuous circular key slots 140 whose roots gradually step down from the outer seating surface 116 to the inner seating surface 118 by the same axial amounts as the rings. These slots have radial widths designated by the number 142 (FIG. 2).

Since each ring 120 includes three circumferentially spaced keys 130 (FIGS. 1, 2, 3, and 18), there are three circumferentially spaced groups of five radially spaced keys each, with the lengths 132 of the keys, i.e., circumferential dimensions, in each such group graduated from the outermost key of maximum length to the innermost key of minimum length. Adjacent ends 136 of the keys in each group are coterminous along radial lines so that the lengths of the keys in a particular group subtend the same angle relative to the axis 83 of the fluid passageway 82. Accordingly, the adjacent ends of adjacent groups of keys define radial drainage gutters 152. These gutters extend from the outer wall 110 to the circular channel defined by the inner seating surface 118, the innermost key ring, and the male coupling member 80. Also, the gutters are respectively in alignment with the vents 107. Because the floor surface 108 has the described inverted frusto-conical shape, the drainage gutters are sloped radially downwardly and inwardly toward the drainage holes. The slope angle of the floor surface 108 and thus of the drainage gutters and also the degree of step-down of the ring ledgers is preferably at about five degrees from horizontal.

The outer wall 110 of the EDI 62 (FIG. 1) has an annular inner surface 160 in concentric, spaced, circumscribing relation to the male coupling member 80 and extending axially endwardly from the floor surface 108. This inner surface 160 defines a bore of the EDI, and an annular outer groove 162 in this surface opens into the bore. The upper end portion of the male coupling member 80 above the base wall 106 also has an annular inner groove 164 facing outwardly into the bore in the same horizontal plane as the outer groove. Outer and inner O-rings 166 and 168, respectively, are fitted in these grooves with the outer O-ring being a bore-type O-ring, and the inner O-ring being a piston-type ring.

The inner surface 160 of the outer wall 110 (FIGS. 1 and 7) is also provided with internal threads 172 above the outer O-ring 166. Radially extending, circumferentially spaced lugs 174 project outwardly from the outer wall to facilitate threading and unthreading of the EDI 62 into and out of the bung hole 38. Furthermore, upper and lower annular latching rims 176 and 177 also project radially outwardly from the outer wall above the lugs with the upper rim being at the upper end of the EDI. These upper and lower rims provide upper and lower frusto-conical latching surfaces 178 and 179, respectively; annular, upper and lower radial latching shoulders 180 and 181, respectively; and upper and lower annular latching groove 182 and 183 therebetween. The latching surfaces are parallel with each other and are preferably at an angle of about forty-five degrees to the horizontal. The EDI is threaded by threads 92 into the bung hole 38 (FIG. 2), and a gasket 186 is provided between the drum 28 and the base wall 106.

Having thus described the extractor drum insert or EDI 62, reference is now made to the extractor head 60 (FIGS. 5 through 9, in particular). The extractor head, or EH as it is abbreviated herein, is also made of a chemically resistant plastic, such as "Teflon" as described above. The EH includes upper and lower parts 190 and 192, respectively (FIGS. 6, 7, and 8), which are made separately and then assembled. The upper part of the EH includes a radial upper-end wall 196, a downwardly projecting outer shroud 198, an upper tubular center fitting 200 extending upwardly above the upper end wall, an upper tubular offset fitting 202 likewise extending upwardly from the upper-end wall, and spaced concentric inner and outer center retainer ridges 203. Internally, the shroud has an upper frusto-conical surface 206; a plurality of upper circumferentially equidistantly spaced, coplanar arcuate detent notches 208, four in the disclosed embodiment, ninety degrees apart; an intermediate cylindrical surface 210; a lower frusto-conical surface 212; and a plurality of lower, circumferentially equidistantly spaced, coplanar arcuate, anti-rotation notches 214 (FIG. 8), four in the disclosed embodiment, ninety degrees apart, and interspersed with the upper deteut notches. The upper and lower notches are thus offset from each other by forty-five degrees and are for purposes to be described.

The shroud 198 (FIGS. 6, 7, and 8) also has an outer cylindrical surface 220; four radially projecting gripping ribs 221, one at each quadrant where the upper detent notches are located; a pair of lower pendent inwardly opposed, U-shaped linear tracks 222 (FIG. 6) on diametrically opposite sides of the EH; and lower flat guide plates 224 (FIGS. 5 and 7) interconnecting opposite ends of the tracks on the other two sides of the EH, at the base thereof, and coplanar with the lower flanges of the tracks. Note that the ribs thicken and thus stiffen and strengthen the shroud at the upper notch locations. The shroud also provides a pair of flat, horizontal, upper, outer guiding surfaces 226 in upwardly spaced parallel relation to the lower guide plates 224 and coplanar with the upper flanges of the tracks; an intermediate annular frusto-conical seat 228 adjacent to the upper flanges of the tracks and to the upper guiding surfaces 226, depending on the location circumferentially of the EH; flat horizontal upper inner seating surfaces 229 adjacent to the anti-rotation notches; and a pair of upper guide plates 230 which extend radially outwardly from the outer surface of the shroud in spaced parallel relation to and above but not opposed to the lower guide plates.

Figure 7:
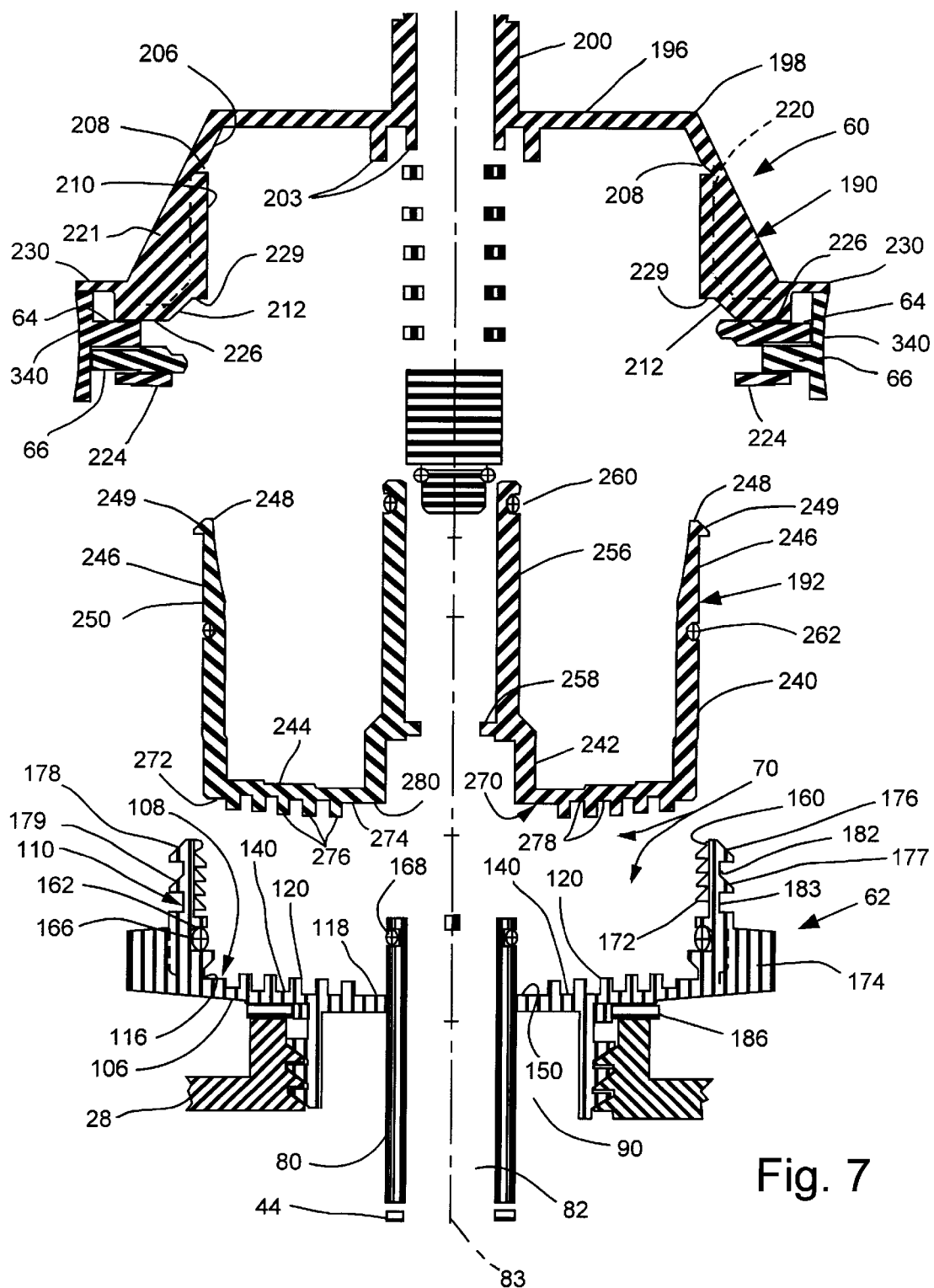
FIG. 7 is a vertical section of both the extractor head and the extractor drum insert along the same plane as FIG. 5, or on line B—B in FIG. 3, with the extractor head being shown in a partially exploded view, or partially disassembled condition, reference being made to partial since the latches are shown in their assembled positions.
Figure 11:
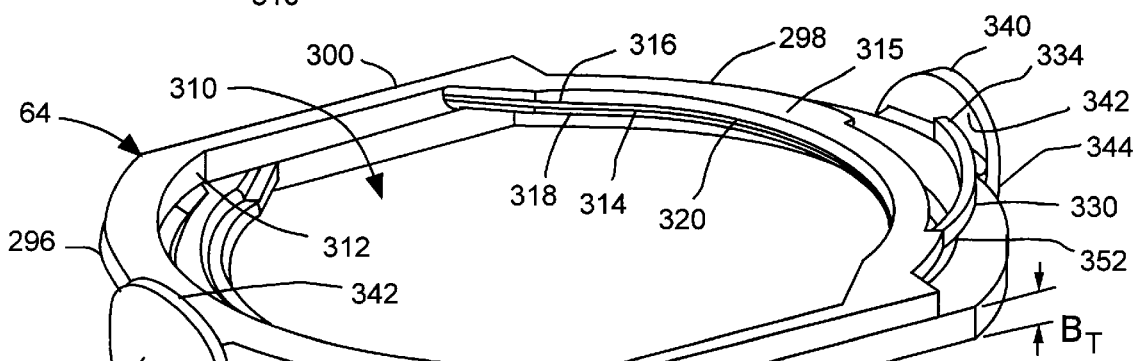
FIG. 11 is an enlarged trimetric view of both the upper and lower latches of the subject coupling, each of which is shown in a coupled position.

The lower part 192 of the EH 60 (FIGS. 7 and 8) includes a cylindrical bottom section 240 in concentric circumscribing relation to an inner tubular female coupling member 242; a lower radially extending base wall 244; a plurality of equidistantly circumferentially spaced (by ninety degrees) anti-rotation stubs 245 (FIG. 11) radially outwardly projecting from the bottom section; and a plurality of equidistantly circumferentially spaced (by ninety degrees) cantilever beams or arms 246 offset forty-five degrees from the stubs and projecting upwardly from the bottom section. The arms are spaced at quadrants of the bottom section in the same spaced relationship as the dent notches 208 in the upper part 190, and the stubs are likewise spaced at quadrants of the bottom section in the same spaced relationship as the anti-rotation notches 208 in the upper part, but offset from, that is interspersed with, the arms. The arms terminate in upper arcuate detents 248 having an arcuate length equal to the arcuate length of the detent notches. The detents have outwardly directed bevels 249 which are tangent to a circle whose diameter is equal to the diameter of the lower edge of the cylindrical surface 210 in the upper part 190, that is, the mouth of the socket defined by this surface 210. Moreover, the outer tips of the detents lie along a circle whose diameter is greater than the diameter of this mouth but approximately equal to the inside diameter of the upper part 190 at the detent notches 208. When the upper and lower parts 190 and 192 of the EH 60 are disassembled as shown in FIG. 7, the arms extend straight up from the bottom section. However, these arms can be resiliently flexed radially inwardly of the lower part, in a cantilever action, during assembly of the upper and lower parts in a manner to be described.

The lower part 192 of the EH 60 (FIGS. 7 and 8) also includes a long tubular lower center fitting 256 coaxially extending upwardly from the female coupling member 242, and a valve seat 258 is provided between the female coupling member and this lower fitting. An inner O-ring 260 circumscribes the upper end of the lower fitting, and an outer O-ring 262 circumscribes the upper end of the bottom section 240 at the base of the arms 246.

The base wall 244 of the lower part 192 of the EH 60 includes a frusto-conical ceiling surface 270 (FIGS. 7, 8, and 17) that is complementary in shape to the floor surface 108 of the EDI 62. The other part of the key-coding system 70 of this invention is provided on this ceiling surface and includes an outer continuous circular seating surface 272; an inner continuous circular seating surface 274 radially inwardly spaced from the outer seating surface; and a plurality of concentric segmented coding rings 276 interspersed with continuous circular key slots 278, these rings and slots having lower ledges and roots stepped upwardly and outwardly in complementary manner to the key coding rings 120 and key slots 140 in the EDI as above described.

Figure 5:
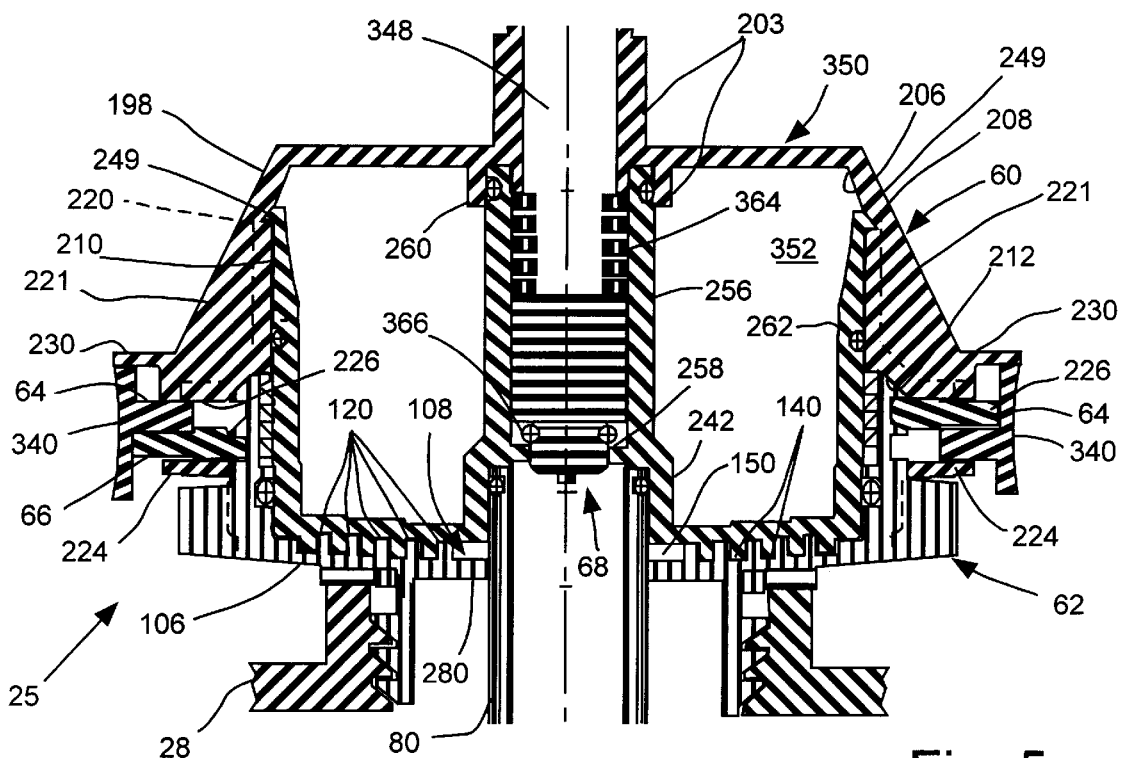
FIG. 5 is a fragmentary vertical section taken on line B—B in FIG. 3, and showing the coupling latched in coupled condition.
Figure 6:
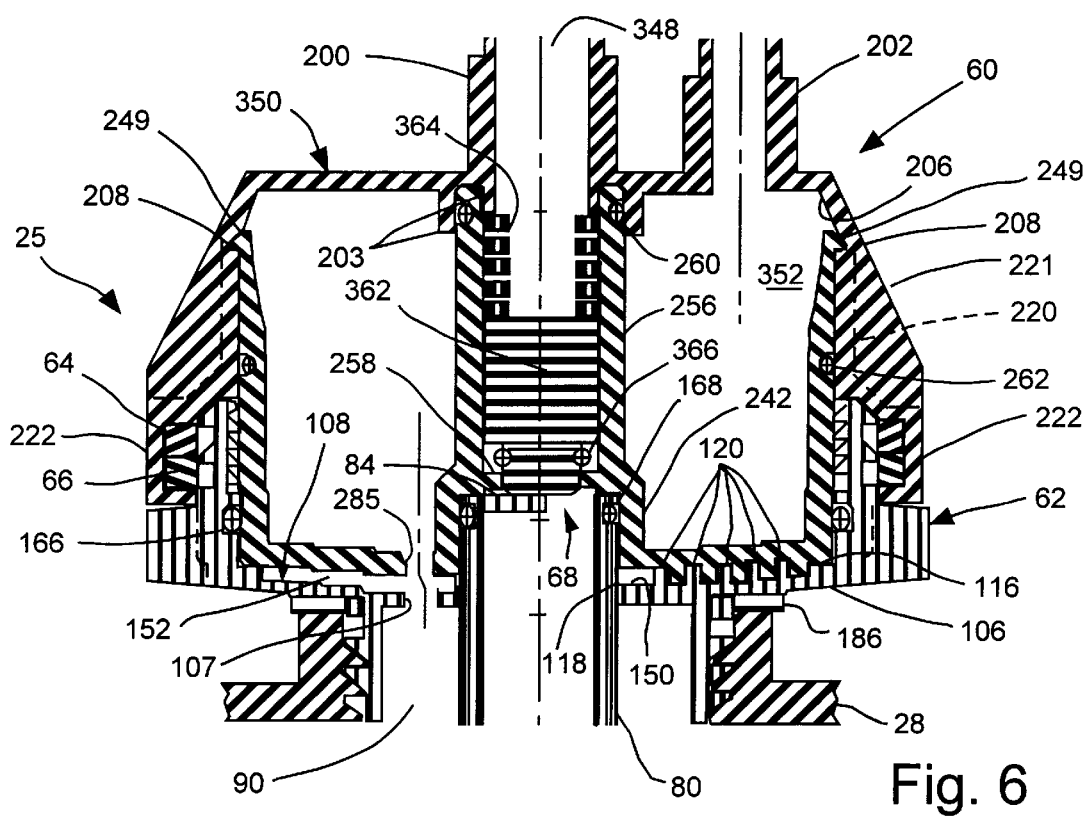
FIG. 6 is a fragmentary vertical section taken on line A—A in FIG. 3, and showing the coupling as it looks whether latched or unlatched or coupled or uncoupled.

The coding rings 276 (FIGS. 7, 8, and 17) are segmented into a plurality of upper arcuate ring segments or keys 282 in a manner similar to that described above with regard to the EDI. As with the EDI described above, the rings 276 in the illustrated embodiment are not continuous but are segmented as shown in FIGS. 3, 4, 17 and 18. When the EH 60 is matched with the EDI, the number, location and width of the upper and lower keys 282 and 130 and the number, location and width of the upper and lower key slots 278 and 140 will be matched so that the ceiling surface 270 will fit flush against the floor surface 108, as shown in FIGS. 5 and 6. Conversely, if the number, location or widths of the keys and key slots are different, the upper and lower keys and slots will not interfit and complete interfitting or interengagement of the EH into the EDI will be precluded, as shown in FIG. 20D, for example, as will be more fully explained hereinafter. Furthermore, the base wall provides a plurality of vents 285 (FIGS. 6, 7, and 20A), three in the disclosed embodiment, circumferentially spaced around and extending through the inner seating surface 274.

As previously mentioned, this EDI 62 and EH 60 are molded parts. It is to be recognized (FIG. 7) that the top or inside surface of the base wall 244 and the undersurface of the base wall 106 are mold-core constant shape, whereas the floor and ceiling surfaces 108 and 270 are mold-core variable shape. By changing the mold, therefore, and thus the shapes or configurations of these surfaces 108 and 270, the coding is changed.

Figure 10:
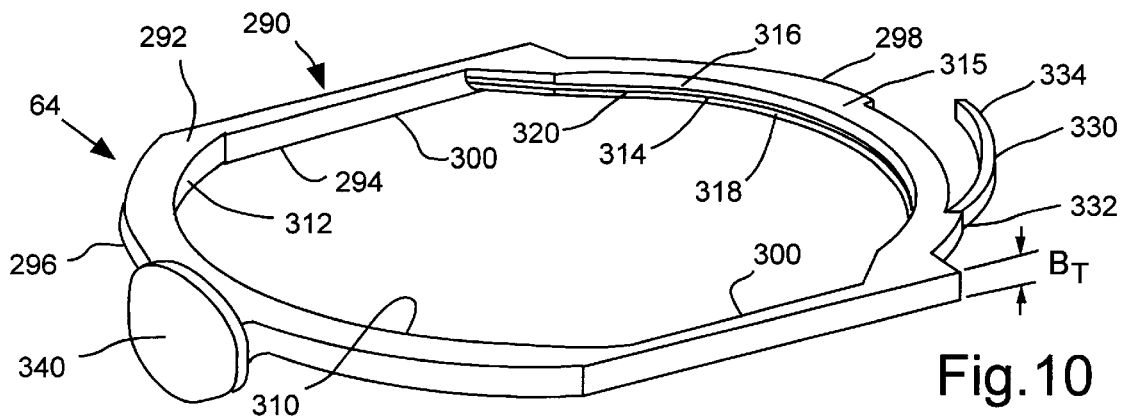
FIG. 10 is an enlarged trimetric view of one of the latches of the subject fluid coupling shown in a latching position.
Figure 10A:
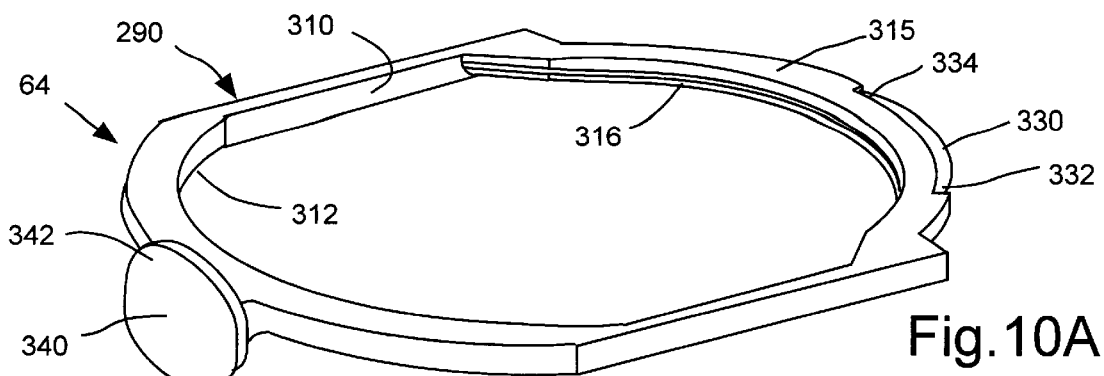
FIGS. 10A, 11A, and 12A are companion views to FIGS. 10, 11, and 12, showing the latches in uncoupled positions.
Figure 11A:
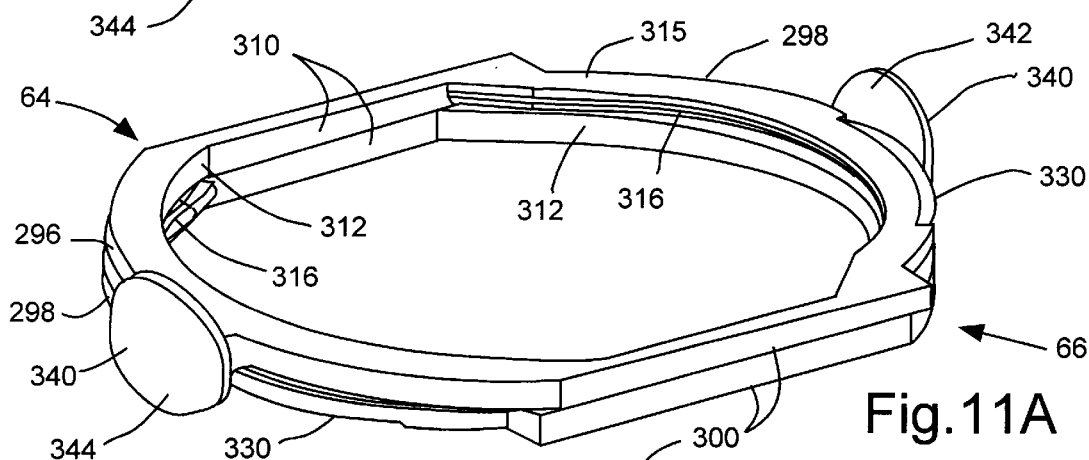

Prior to explaining the assembly of the upper and lower parts 190 and 192 of the EH 60, reference is made to a description of the upper and lower, that is dual, latches 64 and 66 which are a part of the subject quick-release fluid coupling 25. With reference to FIGS. 10 and 10A, the upper latch is described, it being noted that the upper and lower latches are of identical construction and are preferably molded in the same mold out of a suitable plastic. Because the latch requires a greater measure of resilience than the remainder of the coupling and since the latches do not come in contact with the chemicals being carried by the coupling, the latches are preferably molded from acetals or polyolefin type of thermoplastic resin that has the degree of resilient flexibility required, as will be understood. Thus, by reference to FIGS. 10 and 12A, the upper latch, and thus each of the latches, has an elongated planar, generally circular body 290. The body has a top surface 292, a bottom surface 294, a convex actuating end 296, a convex latch end 298, and straight opposite sides 300. The body also has a thickness $B_T$, a length $B_L$, and a width $B_W$.

Each latch 64, 66 (FIGS. 10, 10A) has a generally circular central opening 310 which is defined by an arcuate clearance segment 312 of approximately two hundred forty degrees and an arcuate latching segment 314 of approximately one hundred twenty degrees, but these may be made equal at one hundred and eighty degrees. The latches are identical, but because of their reverse orientation in assembled condition (FIGS. 5 and 14A, B), they are separately described to provide the correct descriptive references. Thus, the latching segment 314 of the upper latch includes an upper radial latching surface 315, and upper and lower bevels 316 and 318 joined by a vertical intermediate abutting surface 320. The latching segment 314 of the lower latch includes a lower radial latching surface 315, and upper and lower bevels 316 and 318 joined by a vertical intermediate abutting surface 320. Each of the upper and lower bevels 316 and 318 of each latching segment is at an angle of twenty-five degrees off vertical, that is, off the abutting surface 320.

Each latch 64, 66 (FIGS. 10, 10A) has a arcuate biasing arm 330 having a hinge end 332 resiliently flexibly integrally connected to one side 300 of the body 290 and a free end 334. The biasing arm is integrally molded with the body so that in its unstressed or relaxed position, it extends angularly outwardly from the latch end 298 of the body, as shown in FIG. 10. The connection between the biasing arm and the body, however, is resiliently flexible to allow the biasing arm to be forced inwardly against the latch end 298, as shown in FIG. 10A. As will be described below, the outwardly extended position (FIG. 10) of the biasing arm is its coupling or latching position, whereas the inward position (FIG. 10A) of the biasing arm is its uncoupled or unlatched position. Alternatively, each latch may use two biasing arms, not shown, each hinged at opposite sides of the body so as to move back and forth like French doors, with each pair of such dual arms having unstressed position extending outwardly in convergent relation and inward resiliently flexed positions against their end of the body 290. In the illustrated embodiment, each latch 64, 66 (FIGS. 10, 10A) includes an arcuate push-button actuator 340 which is integrally molded with the body so that it is connected to the actuating end 296 and has an upper and lower flange 342 and 344. Also, each latch has a coupled length $L_C$ and an uncoupled length $L_{UC}$.

As previously stated, the upper and lower latches 64 and 66 are identical, but as shown in FIGS. 10 and 10A, they are assembled in overlaid inverse relation to each other. That is, the bodies 290 of the latches are stacked one on top of the other with the actuators 340 at opposite ends of the latch assembly and with the biasing arm 330 of one latch bearing against the adjacent flange 342 or 344 of the actuator of the other latch. As shown in FIG. 5, although each latch body is offset from the center of its actuator, the center of each actuator lies at the center of the stacked latches, or more precisely, lies in a horizontal plane passing between the two latch bodies, as that the actuators are symmetrical with the stacked latches, thereby resulting in a balance operation of the assembly as will be seen.

Figure 12:
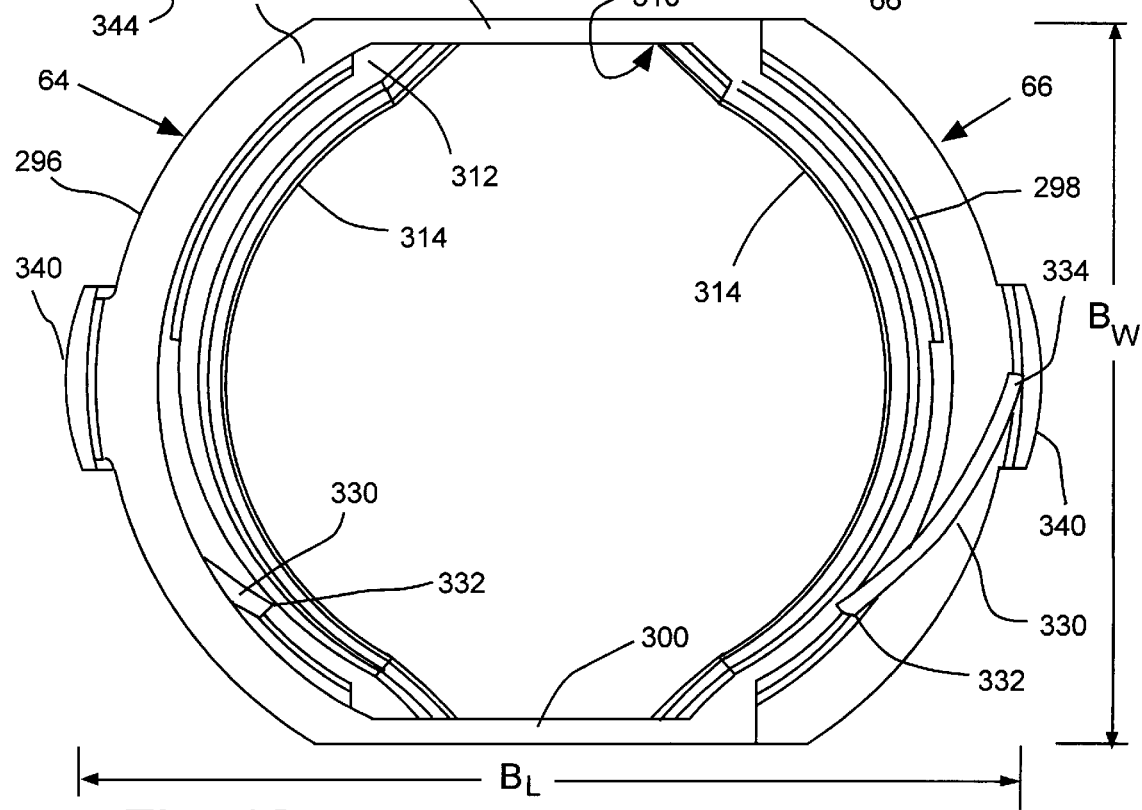
FIG. 12 is a plan view of the latches shown in FIG. 11.
Figure 12A:
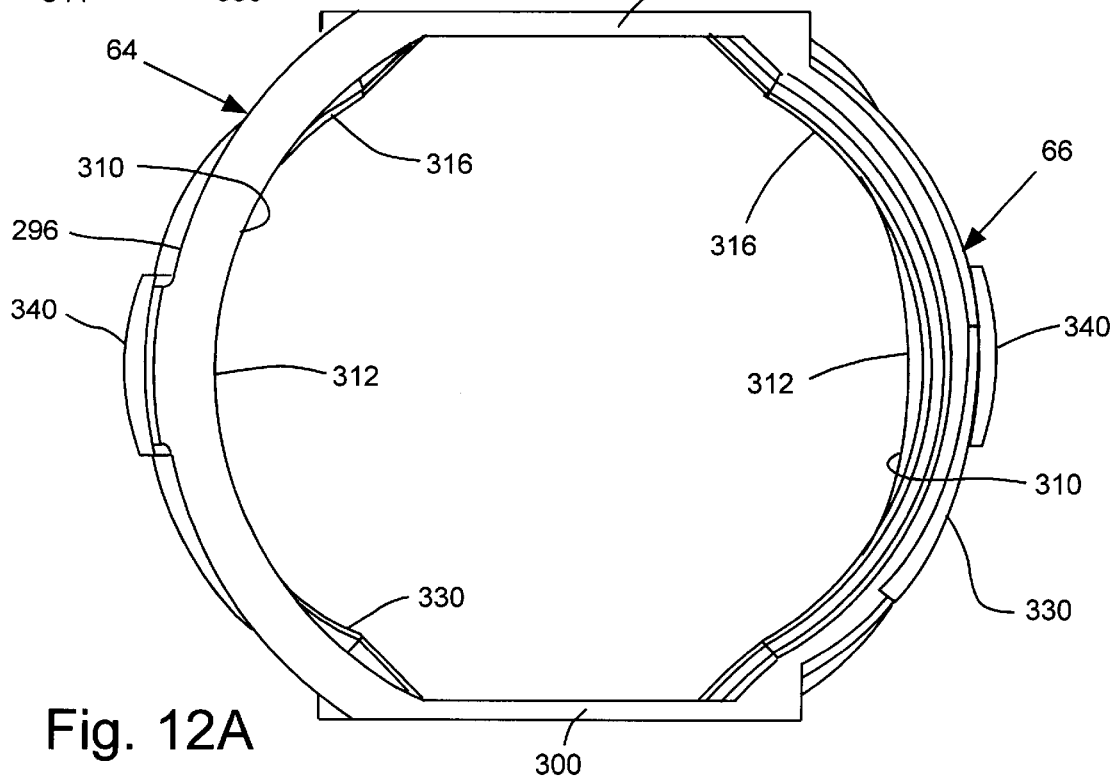

In their stacked overlaid assembly, the openings 310 of the latches 64, 66 are in alignment, although not congruent, in the latched positions (FIGS. 5 and 12). That is, the latches are slidable longitudinally of and against each other, so that normally the biasing arms 330 press outwardly on the actuators 340 to force the actuators outwardly, wherein the openings 310 are still aligned but not congruent. In such latching positions, the latching segment 314 of the upper latch 64 projects inwardly over the clearance segment 312 of the lower latch (FIG. 11), and the latching segment 314 of the lower latch projects inwardly under the clearance segment of the upper latch. On the other hand, when the actuators are manually pressed inwardly toward each other so as to bring the biasing arms 330 against the bodies 290 of the latches (FIGS. 11B, C), the openings are moved into congruent relationship or nearly so.

Figure 8:
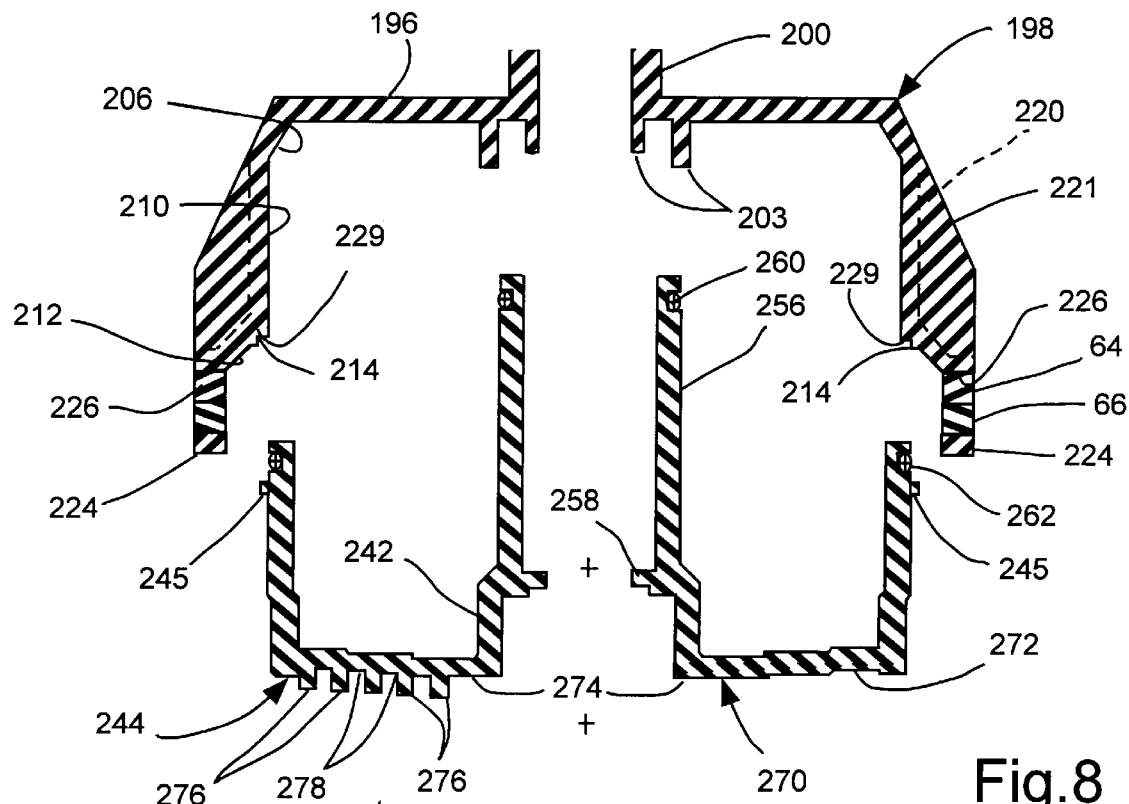
FIG. 8 is a partially exploded or disassembled vertical section of the extractor head, without the poppet valve, taken on line C—C in FIG. 3, again stated to be partial since the latches are shown in their assembled positions.
Figure 9:
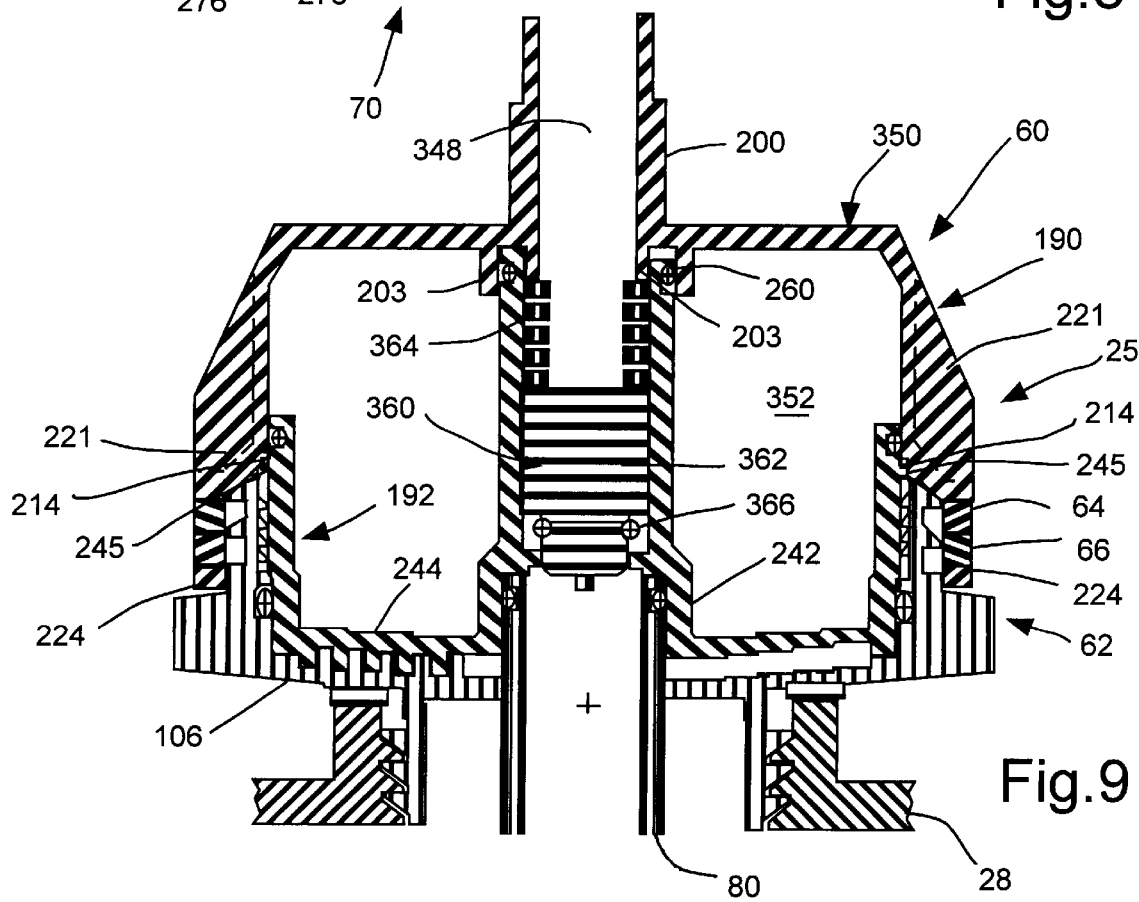
FIG. 9 is a vertical section of the coupling in interfitted condition taken on line C—C in FIG. 3.

Having thus described the upper and lower parts 190 and 192 of the EH 60 and the latches 64 and 66, the complete assembly of these elements is now described. It will be understood that the assembly being described at this point is part of the manufacture of the coupling and is not an assembly that occurs during use of the coupling 25. With reference to FIGS. 7 and 8, the lower latch 66 is first slid into the tracks 222 and on their lower flanges and the lower guide plates 224 from one side of the coupling. Thereafter, the upper latch 64 is slid in on top of the lower latch from the opposite side of the coupling 25. In this regard, it will be understood that the latches are inserted, one on each side, from the sides of the shroud 198 where the guide plates 224 are located and through openings which exist above the guide plates, as best seen in FIG. 7. With the latches assembled to the upper part 190, the lower part 192 is fitted into the upper part. As the lower part moves into the upper part, as may be visualized in FIG. 7, the bevels 249 on the detents 248 of the cantilever arms 246 initially engage the cylindrical surface 210, and as the parts move still closer together, the cylindrical surface 210 causes the arms to flex inwardly. As the connecting movement continues, the detents 248 eventually snap into the upper notches 208, and the anti-rotation stubs 245 enter the lower notches 214. If the lower part is not exactly aligned with the upper part, the two parts must be rotated until the detents and stubs align with their notches.

As the arms 246 (FIGS. 5 and 9) are snapping into their notches 208 and the stubs are entering their notches 214, the lower center fitting 256 seats between the upper retainer ridges 203, communicating with the center fitting 200, and forming a central axial fluid passageway 348 through the EH 60. In this interfitted relationship, the upper and lower parts 190 and 192 also form a housing 350 enclosing a chamber 352 which is in communication with the offset fitting 202 (FIG. 6) and the vents 285; the inner O-ring 260 seals between the upper and lower fittings; and the outer O-ring 262 seals between the shroud 198 and the bottom section 240, so that there is a fluid-tight separation between the chamber 352 and the passageway 348. It will be understood that in this assembly of the upper and lower parts following insertion of the latches 64 and 66, the latches are captured in their described and illustrated positions of assembly. For this very reason, it will also be understood that the latches must be pre-assembled as described since it would not be possible to insert the latches after the upper and lower parts have been thusly assembled. It will also be understood that the interfitting of the cantilever arms and upper notches secures this assembly.

In FIGS. 5 through 7 and 9, the poppet valve 68 is shown to include a valve head 360 engageable with the valve seat 258, a valve stem 362 extending upwardly from the valve head, a spring 364 between the valve head and the inner ridge 203. A noteworthy feature is that the length of the inner ridge sets the compression on the spring. An O-ring 366 encircles the valve head for engagement with the valve seat when the valve is closed (FIGS. 14C and D).

As referred to above, multiple key combinations are provided by the key-coding system 70 of the subject invention. In the disclosed embodiment, these combinations are achieved by varying the number of key coding rings 120 and 276 and slots 140 and 278, their heights, and their depths (or the thickness of the base walls 106 and 244), as shown in FIGS. 7, 19A–F and 20A–F. Other and different combinations can be achieved by varying the key widths 142, key wall angles, key ring diameters, and combinations of these. The important point here is that these variations are either axially or radially related to the axis of the fluid passageways 82, 348, rather than circumferentially of such axis.

It should be noted that one of the codes in the key-coding system 70 of the present invention is a code in which the configurations of the floor surface 108 and the ceiling 270 are smooth and without keys or key slots, as shown in FIG. 19F. Under such an absence of keys and key slots on both the EH 60 and the EDI 62, the ceiling surface fits flush against the floor surface thereby resulting in a match and a coupling of the EH and the EDI. On the other hand if, for example, the ceiling surface has no keys or key slots and the floor surface does (FIG. 20B, for example), then the EH does not fit entirely into the EDI and no coupling is achieved. The absence of keys and key slots is fully compatible with the subject key-coding system which allows for complete coupling of the EH and the EDI without any relative rotation of these parts either prior to or during the coupling movement and irrespective of the relative rotational positions of the EH and EDI prior to coupling.

As examples of coding of a plurality of different extractor heads (EHs) 60 with a plurality of different extractor drum inserts (EDIs) 62 in various drums 28, the following table is provided. From left to right, column 1 sets forth the chemical key-code number which designates matching EH to EDI combinations. This number together with any other part numbers desired is molded in on matching EHs and EDIs. Column 2 gives an indication of the type of chemicals in the various drums, sixteen in the table example. Columns 3 and 4 give the number of key-coding rings 120 (and therefore key slots 140) on the EDI 62 and the number of key-coding rings 276 (and therefore key slots 278) on the EH 60, respectively, or the absence of such rings and slots (in the first row). Column 5 indicates the Fig. No. of the drawings herein which show the matches where five coding rings are used, it being noted that only a five key ring plan is shown in the drawings. Thus, rows one through six provide Fig. Nos., but rows seven through fifteen do not since these other coding plans involve different maximum numbers of key rings 120 and 276 with different key widths from that in the illustrated five key ring plan.

For example, in the five key code ring plan shown, and referring to the table, with chemical key code number 0, as illustrated in FIG. 19F, the EDI has no coding rings or slots and thus the matching EH 60 has no coding rings 276 or slots 278. In this case, the number "0" is molded in on both the EH and EDI as the operator can tell if it is a matched pair. Chemical key-code numbers 1 through 5 have from one coding ring 120 and 276 up to five such coding rings in a five key code plan, with the corresponding matches illustrated in FIGS. 19E, 19D, 19C, 19B, and 19A, respectively, and numbers from "1" to "5" are molded in on the EHs and EDIs. It will be understood that each of the key rings in such a five key code has the same key and slot widths, but the wall 106/244 thicknesses differ where keys and slots are omitted. As examples of mismatches, a number 0 EDI will not match with a number 1 EH (FIG. 20A), nor will a number 1 EDI match a number 0 EH (FIG. 20B).

Although not illustrated in the drawings, with chemical key-code numbers seven through ten in the table, four coding rings 120, 276 are provided, with the keys and slots 130, 140, 282, 272 having a greater width than in the illustrated five key ring plan, since fewer rings are provided. Still further, chemical key-code numbers eleven through thirteen, in this table example, have three coding rings and slots which involve still greater key and slot widths than above. From the foregoing, chemical key-code numbers fourteen, fifteen, and sixteen in the table are believed to be understood.

A very significant feature of the coding system provided by the present invention, however, is that an addition to the molded-in code numbers, all an operator need do, to determine if a match or a mismatch exists, is merely to look at the ends of the EH and EDI to see if they have the same, or different numbers of rings, or none at all.

Although the key-coding examples in the table below provide sixteen different combinations, it will be understood that many other combinations can be provided by varying the configurations of the floor and ceiling surfaces 108 and 270 as by varying key and slot widths, wall angles, and heights and various combinations of these.

CODING EXAMPLES
KEY CODING SYSTEM

| 1<br>CHEMICAL<br>KEY CODE<br>NUMBER | 2<br>TYPE OF<br>CHEMICAL | 3<br>EDI 62 | 4<br>EH 60 | 5<br>FIG. No. |
|---|---|---|---|---|
| 0 | A | 0 | 0 | 19F |
| 1 | B | 1 | 1 | 19E |
| 2 | C | 2 | 2 | 19D |
| 3 | D | 3 | 3 | 19C |
| 4 | E | 4 | 4 | 19B |
| 5 | F | 5 | 5 | 19A |
| 6 | G | 1 | 1 | not shown |
| 7 | H | 2 | 2 | not shown |
| 8 | I | 3 | 3 | not shown |
| 9 | J | 4 | 4 | not shown |
| 10 | K | 1 | 1 | not shown |
| 11 | L | 2 | 2 | not shown |
| 12 | M | 3 | 3 | not shown |
| 13 | N | 1 | 1 | not shown |
| 14 | O | 2 | 2 | not shown |
| 15 | P | 1 | 1 | not shown |

OPERATION

With reference to FIGS. 13A–C, the quick-connect fluid coupling 25 is used in the chemical extraction apparatus 30 by connecting delivery hoses, not shown, to the center fitting 200 and the offset fitting 202 (FIG. 6), respectively, of the EH 60. In a semiconductor manufacturing plant, there are a plurality of EHs connected in such a manner to their respective delivery hoses where the EHs and their associated lines are suspended above a plurality of the fifty-five-gallon drums 28. Each drum is provided with an EDI although it is not in FIG. 13A which is initially welded to the down tube 44 for the drum and then threaded by its external threads 92 into the threaded bung hole 38 with the gasket 186 between the insert and the drum.

When it is desired to connect a set of delivery hoses, not shown, to a particular drum 28, the EH 60 connected to these hoses is manually grasped, conveniently by the ribs 221, and brought down to a position immediately above the EDI 62 in the particular drum. At this time, the condition of the EH and EDI can be visualized by reference to FIG. 13A, it being understood that the EH is still spaced above the EDI although it is not in FIG. 13A. The latches 64, 66 are in their inner latching or coupling positions wherein the latching segments 314 (FIG. 15, project inwardly of their respectively adjacent upper guiding surface 226 and lower guide plate 224. The described position of the latches is shown in FIG. 7, although this Fig. does not show the described positions of the EH and EDI. Also, the poppet valve 68 is closed, that is, the valve head 360 is seated in the valve seat 228. Assuming the EH and the EDI are in vertical alignment, and the operator thinks a match exists, or neglects to check as above described, the EH is moved axially toward an interfitted relationship with the EDI without any necessity of rotating the EH. It will, of course, be recalled that it is very undesirable to rotate or swivel the EH and its connected delivery hoses since such swiveling places undue strain on the hoses as well as causing entanglement of the lines. A big advantage of the subject key-coding system is that it is not dependent on any rotation of the EH to achieve a match or to determine if a match is possible.

Thus, with reference to FIG. 13A, and recognizing that the EDI 62 is stationary, the EH 60 is moved axially down to fit the bottom section 240 of its lower part 292 into the bore of the outer wall 110 of the EDI 62 and to fit the female coupling member 242 of the EH over the male coupling member 80 of the EDI. As this interfitting occurs, several points of engagement are to be noted. First, the bottom section 240 merely slides axially straight down into the outer wall 110 since the internal threads 172 are for the bung 380 and do not affect the interconnection of the EH and EDI. Secondly, if the upper keys 282 and key slots 278 match the lower keys 130 and key slots 140, then the upper keys will eventually fit in their respective lower slots, the upper outer seating ring 272 will eventually rest on the lower outer seating ring 116, the upper inner seating ring 274 will eventually rest on the lower inner seating ring 118, and the upper annular gap 280 will communicate with the lower channel 150. If there is a match, these relationships will eventually occur, and the EH will be allowed to move into coupled connection with the EDI. First, however, other points of engagement occur which should be noted.

As the EH 60 moves down into EDI 62 (FIG. 13A), the lower guide plates 224 and the lower flanges of the tracks 222 move opposite to and outside of the upper rim 176 of the EDI. Continued downward movement causes the edge at the lower beveled surface 318 (FIG. 15) of the latching segment 314 of the lower latch 66 to engage approximately the midpoint of the upper latching surface 178 of the upper rim 176. This engagement pushes the lower latch outwardly against the resiliently yielding biasing arm 330 of the lower latch, allowing the lower latch to slide downwardly past the upper rim and allowing such biasing arm to force the latching segment of the lower latch to enter the upper latching groove 182 under the upper latching shoulder 180, as shown at the left in FIG. 13B.

Figure 15:
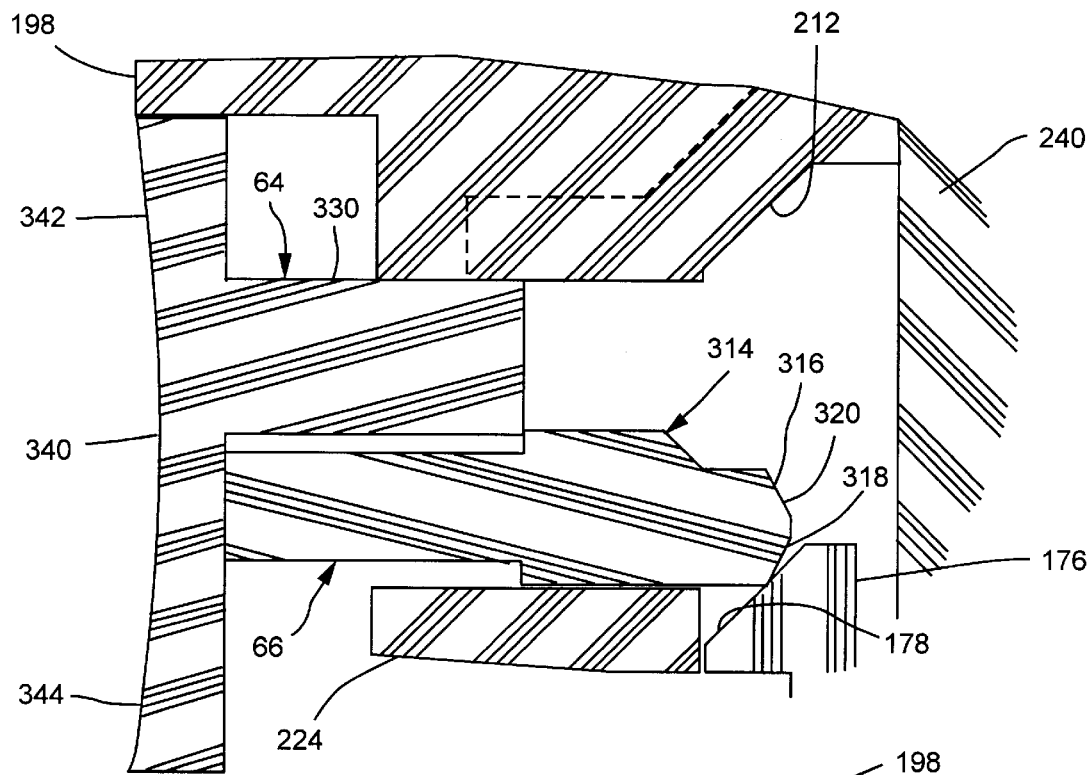
FIGS. 15 and 16 are enlarged detailed vertical sections showing contact between certain latching surfaces of the latches on opposite sides of the coupling, respectively, during and upon completion of the coupling action.

At the same time as the lower latch 66 enters the upper latching groove 182, the latching segment 314 of the upper latch 64 makes initial contact with the upper rim 176, between the lower edge of the lower beveled surface 318 of the upper latching segment and the upper latching surface 178 of the upper rim (FIG. 13B), similar to what is shown for the lower latch in FIG. 15. Also, at this time, the lower latch makes initial contact with the lower rim 177, also seen in FIG. 13B.

Figure 16:
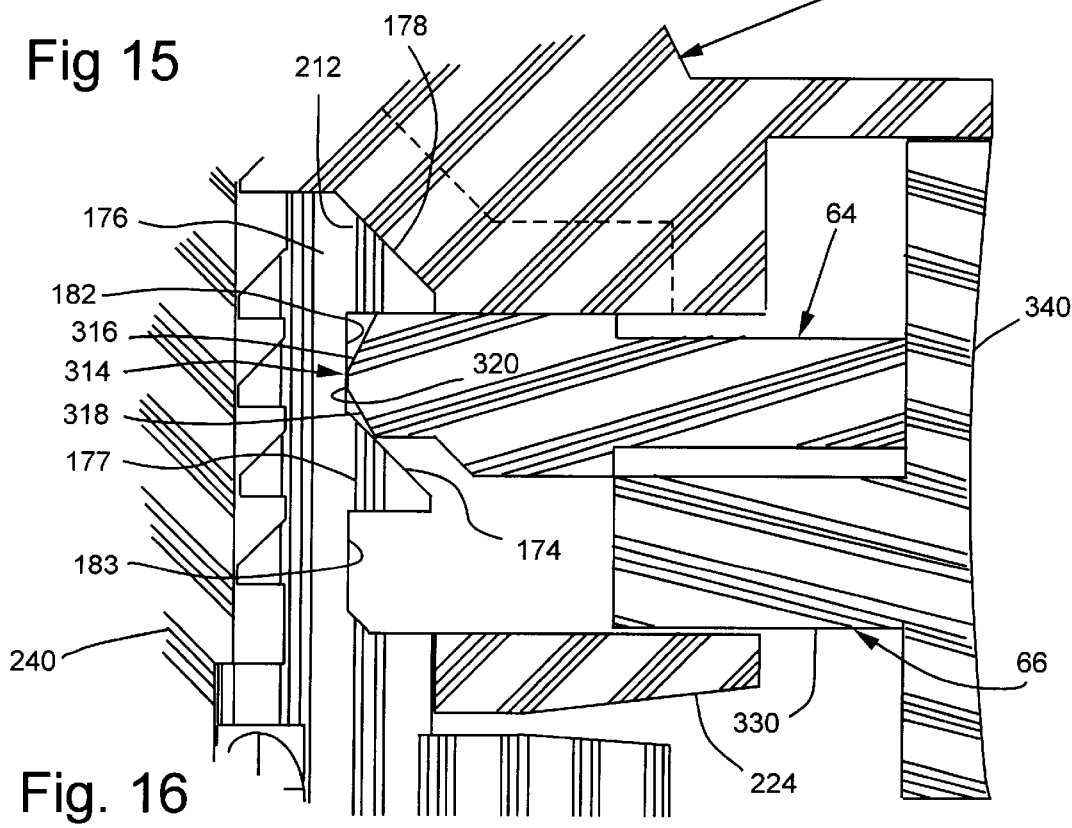
Figure 17:
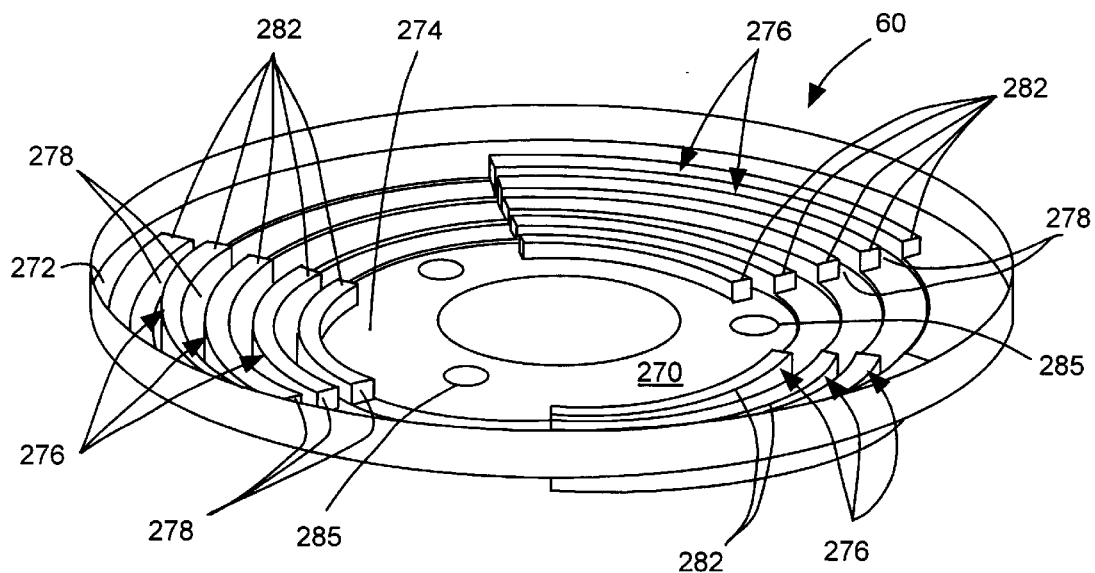
FIGS. 17 and 18 are trimetric schematic views of the upper and lower ends of the coupling members in the extractor head and extractor drum insert of the subject coupling especially to show mating key coding elements on the coupling extractor head and drum insert, respectively, five coding rings being shown on each thereby indicating that the extractor head and drum insert match in accordance with the key coding system of the present invention.

Continued downward movement of the EH 60 (FIG. 13C) causes the upper and lower latching rims 176 and 177 to push the upper and lower latches respectively outwardly so that these latches can be returned inwardly by their biasing arms 330 to have their latching segments 314 enter the upper and lower latching grooves 182 and 183, respectively. Such action causes the EH to seat fully in the EDI with the annular seat 228 resting on the upper latching rim, as shown in FIG. 13C, but also see FIG. 16 for an enlarged view of the upper latch.

Thus, when the upper rim 176 is fully seated (FIG. 13C), the latching segments 314 of the upper and lower latches 64 and 66 move under the upper and lower rims 176 and 177 respectively into their coupled or latching positions thereby coupling the EH 60 to the EDI 62. When in such coupled position, all of the O-rings are effective to provide fluid-tight seals, and the spider 84 opens the poppet valve 360. It is important to note that in the coupled condition, the dual latching segments of the dual latches on the EH firmly engage the EDI about substantially its entire circumference. By increasing the arcuate lengths of the latching segments to one hundred eighty degrees each, as above noted, the latches will engage the entire circumference.

If the key coding on the EH 60 does not match the key coding on the EDI 62, it will be impossible to fit the seat 228 down onto the upper latching rim 176 and thus it will be impossible to complete the coupling of the EH and the EDI. Since the upper and lower key codes do not match, the ceiling surfaces 270 will be held above the floor surface 108 a vertical distance which precludes the seating of the upper rim and the movement of the lataches into the latching grooves 182 and 183. The lower latching segment 314 of the lower latch 66 will have moved below the upper rim 176, but the lower latch will not be allowed to move under the lower rim 177 nor will the upper latch be allowed to move past and under the upper latching rim 177. Full coupling cannot be achieved, a condition that will be immediately recognized by the operator. When full coupling is not achieved, however, if for no other reason, the actuators 340 will remain partly depressed (as shown in each of the mismatching FIGS. 20A through 20F) and will not return to their outermost position.

When full coupling is achieved, however, as shown in FIGS. 20A through 20F, fluid communication is established from the down tube 44 through the fluid passageway 82, through the part in the valve seat 258, through the passageway 348 of the female coupling member 242 into the chemical delivery hose, not shown. Similarly, air supply is achieved from the air hose, not shown, through the offset fitting 202, the chamber 352, the vents 107 and 285, and into the drum 28.

When it is desired to uncouple the EH 60 from the EDI 62 (FIGS. 14A–14D), the operator grasps the EH with both hands and simultaneously presses inwardly on the pushbutton actuators 340 thereby moving the latching segments 314 from the position of FIG. 14A to the position of FIG. 14B. While pressing in on the actuators, the operator lifts up on the EH which is now free to move upwardly from and off of the EDI, as shown in FIG. 14C. Such upward movement moves the valve head 360 up from the spider 34 closing the valve and shutting off the delivery of chemical through the central passageways 82, 348. Any chemical which falls onto the floor surface 108 will drain along the drainage gutters 152 into the inner lower channel 150 from where it drains through the vents 107 back into the drum 28. Finally, the operator releases the actuators and allows the biasing arms 330 to return the latches 64, 66 to their latching positions (FIG. 14D).

Although preferred embodiments of the present invention have been shown and described, various modifications, substitutions and equivalents may be used therein without departing from the spirit and scope of the invention. Accordingly, it is to be understood that the present invention has been described by way of illustration and not limitation.

What is claimed is:

1. A quick-connect coupling for enabling interconnection of only matching fluid delivery and supply lines while preventing the inadvertent interconnection of mismatched lines notwithstanding the presence of a plurality of delivery and supply lines some of which are matched and some of which are mismatched, comprising:

first and second coupling members having fluid passageways and being releasably axially movable into interfitted relationship with said passageways in fluid communication, said coupling members having means connecting one of the coupling members to a supply line and the other coupling member to a delivery line, key coding means on the coupling members which are movable into matched interengagement when the supply and delivery lines connected to the coupling members are matched but which are precluded from moving into such a matched interengagement when said lines are mismatched, said coding means being axially movable into said matched interengagement without relative rotation of the coupling members and irrespective of the relative rotational positions of the coupling members prior to such interengagement, and latch means movable between a retaining position when the key coding means are in matched engagement for releasably maintaining the coupling members in an interconnected relationship and a releasing position permitting separation of the coupling members.

2. The coupling of claim 1, wherein said latch means is precluded from moving into retaining position if the coupling members are not in matched engagement.

3. The coupling of claim 1, wherein the key coding means includes opposed end walls on the coupling members extending transversely of the passageway, and wherein said walls have configurations selected from the group of configurations consisting of one endwardly extending arcuate element lying along a path circumscribing said passageway, a plurality of endwardly extending radially spaced arcuate elements lying along paths circumscribing said passageway, and no such elements.

4. The coupling of claim 3, wherein one of said coupling members has drainage vents therein extending lengthwise of and outside of the passageway, and wherein the element or elements on said one of the coupling members is segmented to provide drainage gutters extending radially relative to the passageway and aligned with said vents.

5. The coupling of claim 1, wherein the key coding means includes opposed end walls on the coupling members extending transversely of the passageway, wherein the key coding means includes a plurality of arcuate segments and slots extending endwardly of each end wall toward the other end wall, and wherein if the segments and slots interfit with each other the couplings are matched and if the segments on one wall contact the other wall and are prevented from interfitting, the couplings are mismatched.

6. The coupling of claim 1, wherein the coding means are radially spaced, axially extending ring segments on the coupling members that interfit with each other when the number and spacing of the ring segments on the coupling members are the same and conflict with each other when the number or spacing of the ring segments on the coupling members are different.

7. The coupling of claim 6, wherein the ring segments are circumferentially spaced and arranged in a plurality of groups of radially spaced ring segments, wherein the ring segments having endwardly disposed faces that are axially spaced from a common plane extending perpendicularly of the passageway; and wherein said spacing of the faces is graduated radially outwardly from the passageway.

8. The coupling of claim 1, wherein the coupling members are relatively axially movable between an uncoupled position completely separated from each other and a coupled position in full interengagement with each other, wherein the latch means is operable to move into retaining position only when the coupling members are in full interengagement, wherein the key coding means has coding elements on the coupling members that contact each other if the coupling members are mismatched and prevent the coupling members from moving into full interengagement, and wherein the key coding means has coding elements on the coupling members that interfit with each other if the coupling members are matched and allow the coupling members to move into full interengagement.

9. A quick-connect coupling for enabling interconnection of only matching fluid delivery and supply lines while preventing the inadvertent interconnection of mismatched lines notwithstanding the presence of a plurality of delivery and supply lines some of which are matched and some of which are mismatched, comprising:

male and female coupling members having fluid passageways and being interconnected in sealed interconnected relationship with said passageways in fluid communication but being releasably axially slidably separable from each other, one of the coupling members being connectable to a supply line and the other coupling member being connectable to a delivery line, coding elements on the coupling members which are movable into matched interengagement when the supply and delivery lines connected to the coupling members are matched but which are precluded from moving into such a matched interengagement when said lines are mismatched, said coding elements being axially movable into said matched interengagement without relative rotation of the coupling members and irrespective of the relative rotational positions of the coupling members prior to such interengagement, and a latching mechanism having a retaining position when the coding elements are in matched engagement in which the coupling members are maintained in an interconnected relationship and a releasing position in which the coupling members are permitted to separate.

10. The coupling of claim 9, wherein the latch mechanism is precluded from moving into retaining position if the coupling members do not match.

11. The coupling of claim 10, wherein the coding elements include opposed end walls on the coupling members extending transversely of the passageway, and wherein said end walls have coded configurations that are complementary and interfit when the coupling members are matched.

12. A quick-connect coupling for enabling interconnection of only matching fluid delivery and supply lines while preventing the inadvertent interconnection of mismatched lines notwithstanding the presence of a plurality of delivery and supply lines some of which are matched and some of which are mismatched, comprising:

first and second coupling members having fluid passageways and being releasably axially movable into interfitted relationships with said passageways in fluid communication, one of the coupling members being connectable to a supply line and the other coupling member being connectable to a delivery line;

key coding elements being movable into matched interengagement when the supply and delivery lines connected to the coupling members are matched but being precluded from moving into such a matched interengagement when said lines are mismatched, and a non-threading latch operable irrespective of the relative rotational positions of the coupling members and latching the coupling members together when the key coding members are in matched interengagement.

13. A quick-connect coupling for enabling interconnection of only matching fluid delivery and supply lines while preventing the inadvertent interconnection of mismatched lines notwithstanding the presence of a plurality of delivery and supply lines some of which are matched and some of which are mismatched, comprising:

first and second coupling members having fluid passageways and being releasably axially movable into interfitted relationships with said passageways in fluid communication, one of the coupling members being connectable to a supply line and the other coupling member being connectable to a delivery line;

key coding elements being movable into matched interengagement when the supply and delivery lines connected to the coupling members are matched but being precluded from moving into such a matched interengagement when said lines are mismatched; and a latch operable irrespective of the relative rotational positions of the coupling members, movable radially of the coupling members, and latching the coupling members together when the key coding elements are in matched interengagement.

14. The coupling of claim 13 wherein there are latches movable radially of the coupling members irrespective of the relative rotational positions of the coupling members and latching the coupling members together when the key coding members are in matched interengagement.

15. A quick-connect coupling for enabling interconnection of only matching fluid delivery and supply lines while preventing the inadvertent interconnection of mismatched lines notwithstanding the presence of a plurality of delivery and supply lines some of which are matched and some of which are mismatched, comprising:

first and second coupling members having fluid passageways and being releasably axially movable into interfitted relationship with said passageways in fluid communication, one of the coupling members being connectable to a supply line and the other coupling member being connectable to a delivery line;

key coding elements on the coupling members which are movable into matched interengagement when the supply and delivery lines connected to the coupling members are matched but which are precluded from moving into such a matched interengagement when said lines are mismatched, said coding elements being axially movable into said matched interengagement without relative rotation of the coupling members and irrespective of the relative rotational positions of the coupling members prior to such interengagement; and a latch movable between a retaining position when the key coding elements are in matched engagement and releasably maintaining the coupling members in an interconnected relationship and a releasing position permitting separation of the coupling members.

16. The coupling of claim 15, wherein said latch is precluded from moving into retaining position if the coupling members are not in matched engagement.

17. The coupling of claim 15, wherein the key coding elements include opposed end walls on the coupling members extending transversely of the passageway; and wherein said walls have configurations selected from the group of configurations consisting of one endwardly extending arcuate element lying along a path circumscribing said passageway, a plurality of endwardly extending arcuate elements lying along paths circumscribing said passageway, and no such elements.

18. The coupling of claim 15, wherein the key coding elements include opposed end walls on the coupling members extending transversely of the passageway;

wherein the key coding elements include a plurality of arcuate elements and arcuate slots extending endwardly of each end wall toward the other end wall; and wherein if the arcuate elements and slots interfit with each other the couplings are matched and if the arcuate elements on one wall contact the other wall and are prevented from interfitting, the couplings are mismatched.

19. The coupling of claim 15, wherein the coding elements are radially spaced, axially extending ring segments on the coupling members that interfit with each other when the number and spacing of the ring segments on the coupling members are the same and conflict with each other when the number or spacing of the ring segments on the coupling members are different.

20. The coupling of claim 19, wherein the ring segments are circumferentially spaced and are arranged in a plurality of groups of radially spaced ring segments;

wherein the ring segments have endwardly disposed faces that are axially spaced from a common plane extending perpendicularly of the passageway; and wherein said spacing of the faces is graduated radially outwardly from the passageway.

21. The coupling of claim 15, wherein the coupling members are relatively axially movable between an uncoupled position completely separated from each other and a coupled position in full interengagement with each other;

wherein the latch is operable to move into retaining position only when the coupling members are in full interengagement;

wherein the key coding elements include coding elements on the coupling members that contact each other if the coupling members are mismatched and prevent the coupling members from moving into full interengagement; and wherein the key coding elements include coding elements on the coupling members that interfit with each other if the coupling members are matched and allow the coupling members to move into full interengagement.

* * * * *